US011977605B2

(12) United States Patent
Gottschlich et al.

(10) Patent No.: US 11,977,605 B2
(45) Date of Patent: May 7, 2024

(54) METHODS AND APPARATUS TO AUTOMATICALLY EVOLVE A CODE RECOMMENDATION ENGINE

(71) Applicant: Intel Corporation, Santa Clara, CA (US)

(72) Inventors: Justin Gottschlich, Santa Clara, CA (US); Niranjan Hasabnis, Fremont, CA (US); Paul Petersen, Austin, TX (US); Shengtian Zhou, Palo Alto, CA (US); Celine Lee, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 17/644,328

(22) Filed: Dec. 14, 2021

(65) Prior Publication Data

US 2022/0334835 A1 Oct. 20, 2022

Related U.S. Application Data

(60) Provisional application No. 63/233,641, filed on Aug. 16, 2021.

(51) Int. Cl.
*G06F 11/36* (2006.01)
*G06F 8/71* (2018.01)
(Continued)

(52) U.S. Cl.
CPC ............... *G06F 18/22* (2023.01); *G06F 8/71* (2013.01); *G06F 8/75* (2013.01); *G06F 9/453* (2018.02);
(Continued)

(58) Field of Classification Search
CPC .... G06F 18/2155; G06F 16/9535; G06F 8/71; G06F 9/453; G06F 8/75; G06F 18/24147;
(Continued)

(56) References Cited

U.S. PATENT DOCUMENTS 11,250,552 B1\* 2/2022 Padfield .............. G06F 18/2155
2012/0179751 A1\* 7/2012 Ahn .................... G06Q 30/0282
709/204

(Continued)

OTHER PUBLICATIONS

Dang et al., CN 106462399, (translation) Oct. 18, 2019, 22 pgs <CN_106462399.pdf>.\*

(Continued)

*Primary Examiner* — Tuan A Vu
(74) *Attorney, Agent, or Firm* — Hanley, Flight & Zimmerman, LLC

(57) ABSTRACT

Methods, apparatus, systems, and articles of manufacture are disclosed that implement an automatically evolving code recommendation engine. In one example, the apparatus collects a user code snippet. The apparatus then determines a structured representation of the user code snippet. Next, the apparatus generates a recommended code snippet using the structured representation of the user code snippet. Then the apparatus obtains user-determined code snippet feedback comparing the user code snippet to the recommended code snippet, the user-determined code snippet feedback indicating one of a match, no match, or uncertain. Finally, the apparatus stores a code snippet training pair in a training database, the code snippet training pair including the user code snippet and the recommended code snippet.

23 Claims, 13 Drawing Sheets

(51) Int. Cl.
  G06F 8/75      (2018.01)
  G06F 9/451     (2018.01)
  G06F 18/214    (2023.01)
  G06F 18/22     (2023.01)
  G06F 18/2413   (2023.01)
  G06N 3/08      (2023.01)
  G06F 16/9535   (2019.01)
  G06Q 30/0282   (2023.01)

(52) U.S. Cl.
  CPC ........ *G06F 18/214* (2023.01); *G06F 18/2155* (2023.01); *G06F 18/24147* (2023.01); *G06N 3/08* (2013.01); *G06F 16/9535* (2019.01); *G06Q 30/0282* (2013.01)

(58) Field of Classification Search
  CPC ........ G06F 18/214; G06F 3/048; G06F 18/22; G06Q 30/0282; G06N 3/08
  See application file for complete search history.

(56) References Cited

U.S. PATENT DOCUMENTS

| | | | |
|---|---|---|---|
| 2019/0391792 | A1 | 12/2019 | Sabharwal et al. |
| 2020/0057634 | A1* | 2/2020 | Makkar ............ G06F 8/71 |
| 2020/0104631 | A1 | 4/2020 | Zhang et al. |
| 2020/0237452 | A1* | 7/2020 | Wolf ............... G06F 3/048 |
| 2020/0409936 | A1* | 12/2020 | Salkola ........... G06F 16/9535 |
| 2021/0081831 | A1 | 3/2021 | Angel et al. |
| 2021/0177373 | A1* | 6/2021 | Xie ................. G06F 9/453 |
| 2022/0188081 | A1* | 6/2022 | Ni .................. G06F 9/453 |

OTHER PUBLICATIONS

European Patent Office, "Extended European Search Report," issued in connection with European Patent Application No. 22182966.6, Dec. 15, 2022, 11 pages.

Gottschlich et al., "The Three Pillars of Machine Programming," Jun. 2018, pp. 69-80, Proceedings of the 2nd ACM SIGPLAN International Workshop on Machine Learning and Programming Languages (MAPL), 12 pages.

Ye et al., "MISIM: A Neural Code Semantics Similarity System Using the Context-Aware Semantics Structure," dated Jun. 2, 2021, available from: [https://arvix.org.pdf/2006.05265.pdf], 22 pages.

Iyer et al., "Software Language Comprehension using a Program-Derived Semantics Graph," dated Dec. 11, 2020, 34th Conference on Neural Information Processing Systems, Computer-Assisted Programming Workshop, 13 pages.

Alon et al., "code2vec: Learning Distributed Representations of Code," Proceedings of the ACM on Programming Languages, vol. 3. No. POPL, pp. 1-29, dated Oct. 30, 2018, 30 pages.

Luan et al., "Aroma: Code Recommendation vis Structural Code Search," Proceedings of the ACM on Programming Languages, vol. 3. No. OOPSLA, pp. 1-29, dated Oct. 17, 2019, 28 pages.

Ben-Nun et al., "Neural Code Comprehension: A Learnable Representation of Code Semantics," Proceedings of the 32nd International Conference on Neural information Processing Systems (NeurIPS '18), dated Nov. 29, 2018, 17 pages.

Hasabnis et al., "ControlFlag: A Self-Supervised Idiosyncratic Pattern Detection System for Software Control Structures," Proceedings of the 5th ACM SIGPLAN International Workshop on Machine Programming (MAPS '21), Jun. 21, 2021, 11 pages.

Alam et al., "A Zero-Positive Learning Approach for Diagnosing Software Performance Regressions," 33rd Conference on Neural Information Processing Systems (NeurIPS 2019), dated Jan. 1, 2020, 13 pages.

Feng et al., "CodeBERT: A Pre-Trained Model for Programming and Natural Languages," in Empirical Methods in Natural Language Processing (EMNLP '20), dated Sep. 18, 2020, 12 pages.

Lu et al., "CodeXGLUE: A Machine Learning Benchmark Dataset for Code Understanding and Generation," retrieved from [https://arvix.org.pdf/2102.04664.pdf], dated Mar. 16, 2021, 14 pages.

Stack Overflow, "Stack Overflow—Where Developers Learn, Share & Build Careers," retrieved from [https://stackoverflow.com] on Dec. 13, 2021, 14 pages.

Kim et al., "FaCoY—A Code-to-Code Search Engine," Proceedings of the 40th International Conference on Software Engineering (ICSE '18), May 27-Jun. 3, 2018, 12 pages.

Krugler, Ken, "Chapter 6 Krugle Code Search Architecture," from Finding Source Code on the Weber for Remix and Reuse, S.E. Sim and R.E. Gallardo-Valencia (editors), Springer Science+Business Media, New York, New York, 2013, pp. 103-120, 19 pages.

Lieby, "Worldwide Professional Developer Population of 24 Million Projected to Grow amid Shifting Geographical Concentrations," dated May 21, 2019, Evans Data Corporation, retrieved from [http://evansdata.com/press/viewRelease.php?pressID=278,] 1 page.

European Patent Office, "Communication Pursuant to Article 94(3) EPC," issued in connection with European Patent Application No. 22182966.6-1203, dated Aug. 28, 2023, 4 Pages.

\* cited by examiner

METHODS AND APPARATUS TO AUTOMATICALLY EVOLVE A CODE RECOMMENDATION ENGINE

RELATED APPLICATION

This patent claims priority to U.S. Provisional Patent Application No. 63/233,641 filed on Aug. 16, 2021.

FIELD OF THE DISCLOSURE

This disclosure relates generally to code recommendation and, more particularly, to automatically evolve a code recommendation engine.

BACKGROUND

Machine programming is concerned with the automation of software. In recent years, there has been a growing body of work in the space of machine programming. One of the open research areas in machine programming is code semantics similarity. Code semantics similarity is the process of determining whether two or more code snippets have some degree of semantic similarity (or equivalence). A particular topic of interest in code semantics similarity is code recommendation. Some of the benefits of an accurate code recommendation engine may include improved programmer productivity, boosted code performance on specific hardware, and education for novice coders.

Figure 1:
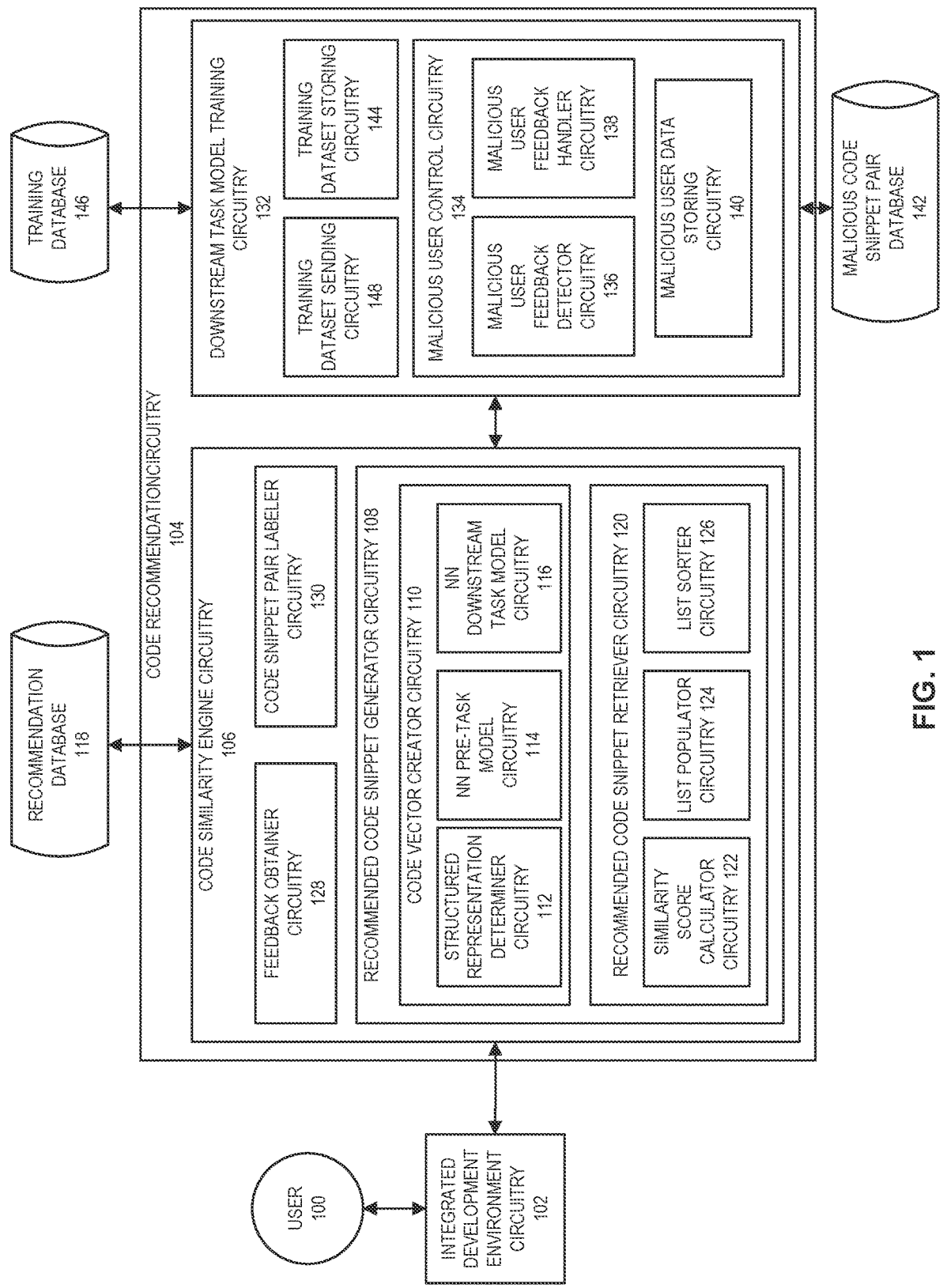
FIG. 1 is a schematic illustration of example circuitry to implement an automatically evolving code recommendation engine.

The figures are not to scale. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

There are a few existing techniques for code recommendation. For example, code-to-code search tools retrieve relevant code snippets from a corpus using a partial code snippet as a query. Such tools can be beneficial in areas like code transplantation recommendation and patch recommendation. These tools use manual rules to extract code features for retrieving recommendations. Manual rules may not adapt to changes in the recommended code corpus. Alternatively, supervised machine-learning based methods can make up such shortcomings. However, these supervised approaches may require millions of manually labeled training data to be effective and obtaining the training data can be expensive.

FIG. 1 is a schematic illustration of example circuitry to implement an automatically evolving code recommendation engine.

In the illustrated example in FIG. 1, a user 100 interacts with a code recommendation circuitry 104 through an integrated development environment (IDE) circuitry 102. In some examples, the code recommendation circuitry 104 is a plug-in for the IDE circuitry 102. In some examples, the user writes code in a user interface in the IDE circuitry 102 and receives recommendations of suggested code snippets from the code recommendation circuitry 104. The term IDE can also be referred to as an "interface" or "interface circuitry." The term "snippet", when referring to code, defines any arbitrary amount of code operated upon within the system shown in FIG. 1 (e.g., as little as one character, word, or command up to one or more pages of code).

In some examples, the apparatus includes means for collecting a user code snippet. For example, the means for collecting may be implemented by IDE circuitry 102. In some examples, the IDE circuitry 102 may be implemented by machine executable instructions such as that implemented by at least block 200 of FIG. 2 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the IDE circuitry 102 is implemented by other hardware logic circuitry, hardware implemented state machines, and/or any other combination of hardware, software, and/or firmware. For example, the IDE circuitry 102 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the code recommendation circuitry 104 learns over time how to better recommend code snippets to user 100 through the IDE circuitry 102. In some examples, the code recommendation circuitry 104 utilizes a neural network model to recommend code snippets that are similar to user input code.

In the illustrated example in FIG. 1, a set of functional blocks are shown within code recommendation circuitry 104. The example code recommendation circuitry 104 includes a code similarity engine circuitry 106. In some examples, the code similarity engine circuitry 106 processes input code (e.g., C++, Python functions) and produces a machine understandable representation of the code. In some examples, the machine understandable representation of the code is a real-valued vector that incorporates the code's syntactic and semantic information. In some examples, this representation is used by the code similarity engine circuitry 106 to retrieve similar code snippets from a database using distance metrics (e.g., L2-norm).

The example code similarity engine circuitry 106 includes a recommended code snippet generator circuitry 108 to generate a recommended code snippet using the structured representation of the user code snippet. In some examples, the recommended code snippet generator circuitry 108 receives a snippet of code from the user 100 through the IDE circuitry 102. In some examples, the recommended code snippet generator circuitry 108 includes a code vector creator circuitry 110. The example code vector creator circuitry 110 includes a structured representation determiner circuitry 112. The structured representation determiner circuitry 112 takes a snippet of source code and translates into a structured representation. In some examples, the structured representation can include an abstract syntax tree and context-aware semantics structure.

In other examples, the functionality of the recommended code snippet generator circuitry 108 is instantiated in instructions. The example recommended code snippet generator instructions (e.g., instructions 1032 in FIG. 10) are loaded into a memory (e.g., local memory 1013 in FIG. 10) and executed by a processor circuitry (e.g., 1012 in FIG. 10) to generate the recommended code snippet.

In other examples, the functionality of the code vector creator circuitry 110 is instantiated in instructions. The example code vector creator instructions (e.g., instructions 1032 in FIG. 10) are loaded into a memory (e.g., local memory 1013 in FIG. 10) and executed by a processor circuitry (e.g., 1012 in FIG. 10) to create a code vector from a code snippet.

In other examples, the functionality of the structured representation determiner 112 is instantiated in instructions. The example structured representation determiner instructions (e.g., instructions 1032 in FIG. 10) are loaded into a memory (e.g., local memory 1013 in FIG. 10) and executed by a processor circuitry (e.g., 1012 in FIG. 10) to take a snippet of source code and translate it into a structured representation.

In some examples, the code similarity engine circuitry 106 includes means for generating a recommended code snippet using the structured representation of the user code snippet. For example, the means for generating may be implemented by the recommended code snippet generator circuitry 108. In some examples, the recommended code snippet generator circuitry 108 may be implemented by machine executable instructions such as that implemented by at least block 204 of FIG. 2 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the recommended code snippet generator circuitry 108 is implemented by other hardware logic circuitry, hardware implemented state machines, and/or any other combination of hardware, software, and/or firmware. For example, the recommended code snippet generator circuitry 108 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the code vector creator circuitry 110 includes means for determining a structured representation of a user code snippet. For example, the means for determining may be implemented by structured representation determiner circuitry 112. In some examples, the structured representation determiner circuitry 112 may be implemented by machine executable instructions such as that implemented by at least block 202 of FIG. 2 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the structured representation determiner circuitry 112 is implemented by other hardware logic circuitry, hardware implemented state machines, and/or any other combination of hardware, software, and/or firmware. For example, the structured representation determiner circuitry 112 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example in FIG. 1, the code vector creator circuitry 110 includes a neural network pre-task model circuitry 114. The example neural network pre-task model circuitry 114 processes the structured representation. The completion of the structured representation processing by the example neural network pre-task model circuitry 114 produces a real-valued vector that represents the original input code snippet. A more detailed description of the processing performed by the code vector creator circuitry 110 is described below in the discussion related to FIG. 2.

In some examples, the neural network pre-task model circuitry 114 is a low-confidence code semantic similarity engine. The example neural network pre-task model circuitry 114 utilizes a neural network downstream task model circuitry 116 to solve specific code recommendation problems (e.g., function name prediction, high-performance code recommendation). The example neural network downstream task model circuitry 116 boosts the performance of the neural network pre-task model circuitry 114 because downstream tasks are specialized to single areas (e.g., high performance code). However, in some examples, the neural network downstream task model circuitry 116 benefits from an amount of manually labeled data, which may not exist at the instantiation of the system shown in FIG. 1. Therefore, in some examples, the neural network pre task model circuitry 114 can be deployed to instantiate the system. In some examples, the accuracy of the code similarity engine circuitry 106 will increase over time as a data set of labeled data is collected to train the neural network downstream task model circuitry 116.

In the illustrated example in FIG. 1, a recommendation database 118 stores recommended code (e.g., recommended code snippets). In some examples, developers may decide initially what code should be used for recommendation. For example, developers may identify an area of code that is being utilized (e.g., BLAS library code, Android developer code, etc.) and then work with a related group (e.g., a library team) to populate the code base at instantiation. In some examples, the code recommendation circuitry 104 is not constrained to one specific area of code recommendation, but rather can work in general for all code databases with different characteristics.

In the illustrated example in FIG. 1, the recommended code snippet generator circuitry 108 includes a recommended code snippet retriever circuitry 120. As mentioned above the structured representation is used by the code similarity engine circuitry 106 to retrieve similar code snippets from a database using distance metrics (e.g., L2-norm). More specifically, the example code vector creator circuitry 110 provides the code vector to the recommended code snippet retriever circuitry 120. The example recommended code snippet retriever circuitry 120 uses the provided code vector to look up a recommended code snippet in a recommendation database 118.

In other examples, the functionality of the recommended code snippet retriever circuitry 120 is instantiated in instructions. The example recommended code snippet retriever instructions (e.g., instructions 1032 in FIG. 10) are loaded into a memory (e.g., local memory 1013 in FIG. 10) and executed by a processor circuitry (e.g., 1012 in FIG. 10) to use a code vector to look up a recommended code snippet in the recommendation database 118.

In some examples, the recommended code snippet generator circuitry 120 includes means for retrieving the recommended code snippet from the recommendation database. For example, the means for retrieving may be implemented by recommended code snippet retriever circuitry 120. In some examples, the recommended code snippet retriever circuitry 120 may be implemented by machine executable instructions such as that implemented by at least block 302 of FIG. 3 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the recommended code snippet retriever circuitry 120 is implemented by other hardware logic circuitry, hardware implemented state machines, and/or any other combination of hardware, software, and/or firmware. For example, the recommended code snippet retriever circuitry 120 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the recommendation database 118 includes a number of code snippets. The code snippets can be stored in the recommendation database 118 in one or more of several formats. For example, each code snippet stored in the recommendation database 118 may be associated with a representative code vector. In some examples, similar code vectors (and their associated code snippets) are clustered together in the recommendation database 118.

In the illustrated example in FIG. 1, the recommended code snippet retriever circuitry 120 includes a similarity score calculator circuitry 122. In some examples, the similarity score calculator circuitry 122 calculates a similarity score of the real-valued code vector to the closest recommended code snippet database cluster using a distance metric. The distance is calculated from the real-valued code vector created by the code vector creator circuitry 110 to a centroid of a closest cluster of code vectors and, their associated code snippets, stored in the recommendation database 118. The similarity score calculated by the similarity score calculator circuitry 122 represents a distance between the created code vector and a code vector in the recommendation database 118 (or to a centroid of a cluster of code vectors in the recommendation database 118).

In other examples, the functionality of the similarity score calculator circuitry 122 is instantiated in instructions. The example similarity score calculator instructions (e.g., instructions 1032 in FIG. 10) are loaded into a memory (e.g., local memory 1013 in FIG. 10) and executed by a processor circuitry (e.g., 1012 in FIG. 10) to calculate a similarity score of the real-valued code vector to the closest recommended code snippet database cluster using a distance metric.

In some examples, the recommended code snippet retriever circuitry 120 includes means for calculating a similarity score of the real-valued code vector to a closest recommended code snippet database cluster including the recommended code snippet. For example, the means for calculating may be implemented by similarity score calculator circuitry 122. In some examples, the similarity score calculator circuitry 122 may be implemented by machine executable instructions such as that implemented by at least block 400 of FIG. 4 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the similarity score calculator circuitry 122 is implemented by other hardware logic circuitry, hardware implemented state machines, and/or any other combination of hardware, software, and/or firmware. For example, the similarity score calculator circuitry 122 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example in FIG. 1, the recommended code snippet retriever circuitry 120 includes a list populator circuitry 124. The example list populator circuitry 124 populates a list of code snippets that have the smallest calculated distances to the created code vector. In some examples, the list populator circuitry 124 populates the list of code snippets with a predetermined number of code snippets. In other examples, the list populator circuitry 124 populates the list of the code snippets with any number of code snippets under a calculated specific distance to the created code vector.

In other examples, the functionality of the list populator circuitry 124 is instantiated in instructions. The example list populator instructions (e.g., instructions 1032 in FIG. 10) are loaded into a memory (e.g., local memory 1013 in FIG. 10) and executed by a processor circuitry (e.g., 1012 in FIG. 10) to populate a list of code snippets that have the smallest calculated distances to the created code vector.

In some examples, the recommended code snippet receiver circuitry 120 includes means for populating a list of recommended code snippets at least partially with the recommended code snippet. For example, the means for populating may be implemented by list populator circuitry 124. In some examples, the list populator circuitry 124 may be implemented by machine executable instructions such as that implemented by at least block 402 of FIG. 4 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the list populator circuitry 124 is implemented by other hardware logic circuitry, hardware implemented state machines, and/or any other combination of hardware, software, and/or firmware. For example, the list populator circuitry 124 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example in FIG. 1, the recommended code snippet retriever circuitry 120 includes a list sorter circuitry 126. the example list sorter circuitry 126 sorts the list created by list populator circuitry 124 starting with a least distant code vector (and associated code snippet) and ending with a most distant code vector (and associated code snippet). In different examples, the populated and sorted list of code snippets maybe from a single code snippet up to any number of code snippets greater than one. The list of code snippets is referred to as a list of "recommended" code snippets because the distances between the code vectors of the code snippets in the list to the created code vector are small (i.e., the code snippets are similar and therefore recommended).

In other examples, the functionality of the list sorter circuitry 126 is instantiated in instructions. The example list sorter instructions (e.g., instructions 1032 in FIG. 10) are loaded into a memory (e.g., local memory 1013 in FIG. 10) and executed by a processor circuitry (e.g., 1012 in FIG. 10) to sort the list created by list populator circuitry 124 starting with a least distant code vector (and associated code snippet) and ending with a most distant code vector (and associated code snippet).

In some examples, the recommended code snippet receiver circuitry 120 includes means for sorting a list of recommended code snippets with a most confident recommended code snippet with a closest similarity score first to a least confident recommended code snippet with a furthest similarity score last. For example, the means for sorting may be implemented by list sorter circuitry 126. In some examples, the list sorter circuitry 126 may be implemented by machine executable instructions such as that implemented by at least block 404 of FIG. 4 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the list sorter circuitry 126 is implemented by other hardware logic circuitry, hardware implemented state machines, and/or any other combination of hardware, software, and/or firmware. For example, the list sorter circuitry 126 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the recommended code snippet generator circuitry 108 includes means for creating a real-valued code vector from the structured representation of the user code snippet. For example, the means for creating may be implemented by code vector creator circuitry 110. In some examples, the code vector creator circuitry 110 may be implemented by machine executable instructions such as that implemented by at least block 300 of FIG. 3 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the code vector creator circuitry 110 is implemented by other hardware logic circuitry, hardware implemented state machines, and/or any other combination of hardware, software, and/or firmware. For example, the code vector creator circuitry 110 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the recommended code snippet generator circuitry 108 sends the list of recommended code snippets to the user 100 through a user interface in the IDE circuitry 102. In different examples, the visual format of the list of recommended code snippets presented to the user 100 can be any format that presents the list of recommended code snippets in an understandable way. In some examples, the IDE circuitry 102 prompts the user for feedback. In some examples, user feedback includes a user input comparing each recommended code snippet in the list to the user code snippet (e.g., the user code snippet received from the user 100 through the IDE circuitry 102 and represented by the code vector created by the code vector creator circuitry 110). In some examples, the user input is one of the following:

MATCH: The user indicates a given recommended code snippet matches (e.g., semantically and/or syntactically) the user code snippet.

NO MATCH: The user indicates a given recommended code snippet does not match (e.g., semantically and/or syntactically) the user code snippet.

UNCERTAIN: The user either actively indicates he/she is unsure whether a given recommended code snippet matches (e.g., semantically and/or syntactically) the user code snippet OR the user does not provide a response.

In the illustrated example in FIG. 1, the code similarity engine circuitry 106 includes a feedback obtainer circuitry 128 and a code snippet pair labeler circuitry 130. The example feedback obtainer circuitry 128 receives the user input (e.g., match, no match, or uncertain) for a given recommended code snippet from the IDE circuitry 102. The user input is utilized as a label for a code snippet training pair. In some examples, each code snippet training pair includes a user code snippet (UCS), a recommended code snippet (RCS), and a label corresponding to the user input (as described above) for the recommended code snippet. The example code snippet pair labeler circuitry 130 labels the code snippet pair with a value corresponding to a label (e.g., match, no match, or uncertain).

In other examples, the functionality of the feedback obtainer circuitry 128 is instantiated in instructions. The example feedback obtainer instructions (e.g., instructions 1032 in FIG. 10) are loaded into a memory (e.g., local memory 1013 in FIG. 10) and executed by processor circuitry (e.g., 1012 in FIG. 10) to receive the user input for a given recommended code snippet from the IDE circuitry 102.

In other examples, the functionality of the code snippet pair labeler circuitry 130 is instantiated in instructions. The example code snippet pair labeler instructions (e.g., instructions 1032 in FIG. 10) are loaded into a memory (e.g., local memory 1013 in FIG. 10) and executed by processor circuitry (e.g., 1012 in FIG. 10) to label the code snippet pair with a value corresponding to a label.

In some examples, the code similarity engine circuitry 106 includes means for labeling a code snippet pair. For example, the means for labeling may be implemented by code snippet pair labeler circuitry 130. In some examples, the code snippet pair labeler circuitry 130 may be implemented by machine executable instructions such as that implemented by at least block 508 of FIG. 5 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the code snippet pair labeler circuitry 130 is implemented by other hardware logic circuitry, hardware implemented state machines, and/or any other combination of hardware, software, and/or firmware. For example, the code snippet pair labeler circuitry 130 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the code similarity engine circuitry 106 includes means for obtaining a user-determined code snippet feedback. For example, the means for obtaining may be implemented by feedback obtainer circuitry 128. In some examples, the feedback obtainer circuitry 128 may be implemented by machine executable instructions such as that implemented by at least block 206 of FIG. 2 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the feedback obtainer circuitry 128 is implemented by other hardware logic circuitry, hardware implemented state machines, and/or any other combination of hardware, software, and/or firmware. For example, the feedback obtainer circuitry 128 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example in FIG. 1, the code recommendation circuitry 104 includes a downstream task model training circuitry 132. The example code snippet pair labeler circuitry 130 provides the code snippet pair (with the label) to the downstream task model training circuitry 132 to use for training the neural network downstream task-model circuitry 116.

In some examples, prior to utilizing any code snippet pair for training, The downstream task model training circuitry 132 checks for malicious user input. In the illustrated example in FIG. 1, the downstream task model training circuitry 132 includes a malicious user control circuitry 134 to provide a safety mechanism to prevent malicious user feedback on code snippet pairs from being used to train the neural network downstream task model circuitry 116.

The example malicious user control circuitry 134 includes a malicious user feedback detector circuitry 136. The example malicious user feedback detector circuitry 136 detects if there is any data that is maliciously created by the user to fool the system. One example of malicious data would be code snippet pairs where the user intentionally chooses inappropriate feedback. If the system does not verify the user feedback against the code snippet pair, malicious feedback could mislead the learning of the neural network downstream task model circuitry 116, which would lead to false results from the similarity score calculator circuitry 122.

In other examples, the functionality of the malicious user feedback detector circuitry 136 is instantiated in instructions. The example malicious user feedback detector instructions (e.g., instructions 1032 in FIG. 10) are loaded into a memory (e.g., local memory 1013 in FIG. 10) and executed by processor circuitry (e.g., 1012 in FIG. 10) to detect if there is any data that is maliciously created by the user to fool the system.

In some examples, the apparatus includes malicious user control circuitry 134 for detecting malicious user-determined code snippet feedback from a user. For example, the means for detecting may be implemented by malicious user feedback detector circuitry 136. In some examples, the malicious user feedback detector circuitry 136 may be implemented by machine executable instructions such as that implemented by at least blocks 600 of FIG. 6 and 700 of FIG. 7 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the malicious user feedback detector circuitry 136 is implemented by other hardware logic circuitry, hardware implemented state machines, and/or any other combination of hardware, software, and/or firmware. For example, the malicious user feedback detector circuitry 136 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, malicious data (e.g., user feedback) detection includes two phases: 1) a manual detection phase, and 2) a learned detection phase. During the manual detection phase, which happens for a limited time period, one or more users/developers inspect code snippet pairs and their corresponding user feedback labels to determine if user feedback was entered maliciously. If so, the code snippet pair, the label, and information regarding the user that entered the malicious feedback is stored. Once a sufficient malicious data set has been generated in phase one, then the example malicious user control circuitry 134 enters the learned detection phase.

In the illustrated example in FIG. 1, the malicious user control circuitry 134 includes a malicious user feedback handler circuitry 138. During the learned detection phase, when the example malicious user feedback detector circuitry 136 detects malicious user feedback, the malicious user feedback handler circuitry 138 disallows the affected code snippet pair from being saved to the neural network downstream task model circuitry 116 training data set. In some examples, the code snippet pair and the user feedback label are ignored. Additionally, in some examples the malicious user control circuitry 134 includes a malicious user data storing circuitry 140. In some examples, the malicious user data storing circuitry 140 stores information regarding the code snippet pair, the malicious user feedback, and information regarding the user in a malicious code snippet pair database 142.

In some examples, the malicious code snippet pair database 142 stores all known code snippet pairs that have been linked to malicious user feedback. Thus, in the learned detection phase, the malicious user feedback detector circuitry 136 can search the malicious code snippet pair database 142 for known code snippet pairs with malicious user feedback. In some examples, the malicious code snippet pair database 142 keeps a running tally of malicious feedback attempts by user ID. In some examples, if a given user ID has provided enough malicious user feedback to pass a threshold value, the malicious user feedback handler circuitry 138 will not allow any user feedback from that user ID. In other examples, each user ID is tracked in the malicious code snippet pair database 142 with a user rating value. Each time a user provides valid feedback, that user's rating value increases. Conversely, each time the user 100 provides malicious feedback, that user's rating value decreases. In these examples, a user's rating value can be applied to his/her user feedback as a weight component, which can increase or decrease the importance of the user feedback.

In other examples, the functionality of the malicious user feedback handler circuitry 138 is instantiated in instructions. The example malicious user feedback handler instructions (e.g., instructions 1032 in FIG. 10) are loaded into a memory (e.g., local memory 1013 in FIG. 10) and executed by processor circuitry (e.g., 1012 in FIG. 10) to disallow a maliciously labeled code snippet pair from being saved to the neural network downstream task model circuitry 116 training data set.

In other examples, the functionality of the malicious user data storing circuitry 138 is instantiated in instructions. The example malicious user data storing instructions (e.g., instructions 1032 in FIG. 10) are loaded into a memory (e.g., local memory 1013 in FIG. 10) and executed by processor circuitry (e.g., 1012 in FIG. 10) to store information regarding the code snippet pair, the malicious user feedback, and information regarding the user in a malicious code snippet pair database 142.

In some examples, the malicious user control circuitry 134 includes means for disallowing the storing of the code snippet training pair in the training database in response to malicious user-determined code snippet feedback from a user being detected and means for ignoring user-determined code snippet feedback from the user in response to the count of malicious user-determined code snippet feedback attempts exceeding a threshold. For example, the means for disallowing and the means for ignoring may be implemented by malicious user feedback handler circuitry 138. In some examples, the malicious user feedback handler circuitry 138 may be implemented by machine executable instructions such as that implemented by at least blocks 602 of FIG. 6 and 802 of FIG. 8 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the malicious user feedback handler circuitry 138 is implemented by other hardware logic circuitry, hardware implemented state machines, and/or any other combination of hardware, software, and/or firmware. For example, the malicious user feedback handler circuitry 138 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the malicious user control circuitry 134 includes means for storing the code snippet training pair with the detected malicious user-determined code snippet feedback in a malicious code snippet pair database, means for storing identification information about the user, and means for storing a count of malicious user-determined code snippet feedback attempts by the user. For example, the means for storing may be implemented by malicious user data storing circuitry 140. In some examples, the malicious user data storing circuitry 140 may be implemented by machine executable instructions such as that implemented by at least blocks 802, 804, and 806 of FIG. 8 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the malicious user data storing circuitry 140 is implemented by other hardware logic circuitry, hardware implemented state machines, and/or any other combination of hardware, software, and/or firmware. For example, the malicious user data storing circuitry 140 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example in FIG. 1, the downstream task model training circuitry 132 includes a training data set storing circuitry 144. Assuming the user feedback is not malicious, the example training data sets storing circuitry 144 stores the code snippet pair (and label) as a code snippet training pair in a training database 146. In some examples, the labeled code snippet training pair is added to the training data set for the neural network downstream task models circuitry 116. The training data set, stored in the training database 146, increases in size as the user 100 (or users) code in the IDE circuitry 102 over time.

In other examples, the functionality of the training dataset storing circuitry 144 is instantiated in instructions. The example training dataset storing instructions (e.g., instructions 1032 in FIG. 10) are loaded into a memory (e.g., local memory 1013 in FIG. 10) and executed by processor circuitry (e.g., 1012 in FIG. 10) to store the code snippet pair (and label) as a code snippet training pair in a training database 146.

In some examples, the downstream task model training circuitry 132 includes means for storing a code snippet training pair in a training database. For example, the means for storing may be implemented by training dataset storing circuitry 144. In some examples, the training dataset storing circuitry 144 may be implemented by machine executable instructions such as that implemented by at least block 308 of FIG. 3 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the training dataset storing circuitry 144 is implemented by other hardware logic circuitry, hardware implemented state machines, and/or any other combination of hardware, software, and/or firmware. For example, the training dataset storing circuitry 144 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example in FIG. 1, the downstream task model training circuitry 132 includes a training data set sending circuitry 148. During training of the example neural network downstream task model circuitry 116, the training data set sending circuitry 148 sends the training data set from the training database 146 to the NN downstream task model circuitry 116 to train the downstream task model. The example training data set sending circuitry 148 includes a timer. In these examples, the training data set is built up over a period of time (e.g., 6 months) and when the timer expires, the training data set sending circuitry 148 enters into training mode it sends the training data set to the neural network downstream task model circuitry 116. In other examples, the training is dynamic and happens continuously as new code snippet pairs are received. In some examples, the downstream task model can be trained as a binary classification problem (i.e., predict if a code pair is semantically equivalent) on the accumulated dataset collected from users. In some examples, once the downstream task model is trained, a continuous integration and continuous deployment pipeline may be implemented to automatically deploy and update the model to the framework. In other examples, the NN downstream task model circuitry 116 is a part of the downstream task model training circuitry 132.

In other examples, the functionality of the training dataset sending circuitry 148 is instantiated in instructions. The example training dataset sending instructions (e.g., instructions 1032 in FIG. 10) are loaded into a memory (e.g., local memory 1013 in FIG. 10) and executed by processor circuitry (e.g., 1012 in FIG. 10) to sends the training data set from the training database 146 to the NN downstream task model circuitry 116 to train the downstream task model.

In some examples, the downstream task training model circuitry 132 includes means for training a downstream task model to calculate the similarity score by feeding the downstream task model a training dataset and means for training the downstream task model when a timer expires. For example, the means for training may be implemented by training dataset sending circuitry 148. In some examples, the training dataset sending circuitry 148 may be implemented by machine executable instructions such as that implemented by at least block 1002 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the training dataset sending circuitry 148 is implemented by other hardware logic circuitry, hardware implemented state machines, and/or any other combination of hardware, software, and/or firmware. For example, the training dataset sending circuitry 148 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the code recommendation circuitry 104 is illustrated in FIG. 1, one or more of the elements, processes, and/or devices illustrated in FIG. 1 may be combined, divided, re-arranged, omitted, eliminated, and/or implemented in any other way. Further, the example integrated development environment circuitry 102, the example code similarity engine circuitry 106, the example recommended code snippet generator circuitry 108, the example code vector creator circuitry 110, the example structured representation determiner circuitry 112, the example neural network pre-task model circuitry 114, the example neural network downstream task model circuitry 116, the example recommendation database 118, the example recommended code snippet retriever circuitry 120, the example similarity score calculator circuitry 122, the example list populator circuitry 124, the example list sorter circuitry 126, the example feedback obtainer circuitry 128, the example code snippet pair labeler circuitry 130, the example downstream task model training circuitry 132, the example malicious user control circuitry 134, the example malicious user feedback detector circuitry 136, the example malicious user feedback handler circuitry 138, the example malicious user data storing circuitry 140, the example malicious code snippet pair database 142, the example training dataset storing circuitry 144, the example training database 146, the example training dataset sending circuitry 148, and/or, more generally, the example code recommendation circuitry 104 of FIG. 1, may be implemented by hardware, software, firmware, and/or any combination of hardware, software, and/or firmware. Thus, for example, any of the example integrated development environment circuitry 102, the example code similarity engine circuitry 106, the example recommended code snippet generator circuitry 108, the example code vector creator circuitry 110, the example structured representation determiner circuitry 112, the example neural network pre-task model circuitry 114, the example neural network downstream task model circuitry 116, the example recommendation database 118, the example recommended code snippet retriever circuitry 120, the example similarity score calculator circuitry 122, the example list populator circuitry 124, the example list sorter circuitry 126, the example feedback obtainer circuitry 128, the example code snippet pair labeler circuitry 130, the example downstream task model training circuitry 132, the example malicious user control circuitry 134, the example malicious user feedback detector circuitry 136, the example malicious user feedback handler circuitry 138, the example malicious user data storing circuitry 140, the example malicious code snippet pair database 142, the example training dataset storing circuitry 144, the example training database 146, the example training dataset sending circuitry 148, and/or, more generally, the example code recommendation circuitry 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example integrated development environment circuitry 102, the example code similarity engine circuitry 106, the example recommended code snippet generator circuitry 108, the example code vector creator circuitry 110, the example structured representation determiner circuitry 112, the example neural network pre-task model circuitry 114, the example neural network downstream task model circuitry 116, the example recommendation database 118, the example recommended code snippet retriever circuitry 120, the example similarity score calculator circuitry 122, the example list populator circuitry 124, the example list sorter circuitry 126, the example feedback obtainer circuitry 128, the example code snippet pair labeler circuitry 130, the example downstream task model training circuitry 132, the example malicious user control circuitry 134, the example malicious user feedback detector circuitry 136, the example malicious user feedback handler circuitry 138, the example malicious user data storing circuitry 140, the example malicious code snippet pair database 142, the example training dataset storing circuitry 144, the example training database 146, the example training dataset sending circuitry 148, and/or, more generally, the example code recommendation circuitry of FIG. 1 is/are hereby expressly defined to include a non-transitory computer readable storage device or storage disk such as a memory, a digital versatile disk (DVD), a compact disk (CD), a Blu-ray disk, etc., including the software and/or firmware. Further still, the example code recommendation circuitry 104 of FIG. 1 may include one or more elements, processes, and/or devices in addition to, or instead of, those illustrated in FIG. 1, and/or may include more than one of any or all of the illustrated elements, processes and devices.

Flowcharts representative of example hardware logic circuitry, machine readable instructions, hardware implemented state machines, and/or any combination thereof for implementing the code recommendation circuitry 104 of FIG. 1 is shown in FIGS. 2-9. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIG. 11 and/or 12. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 10, many other methods of implementing the example code recommendation circuitry 104 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 2-9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3)

at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 2:
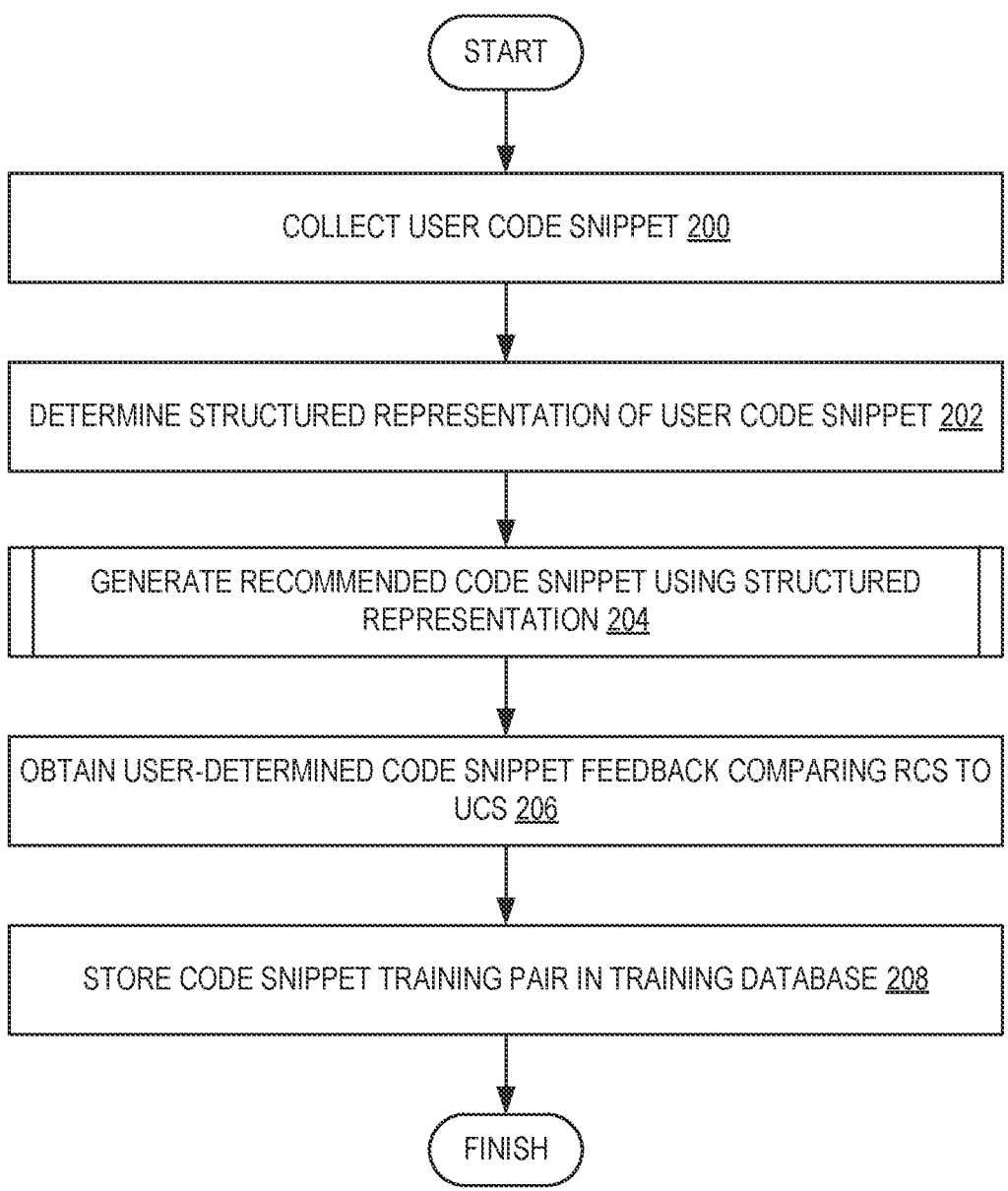
FIG. 2 is a flowchart representative of example machine readable instructions and/or example operations that may be executed and/or instantiated by processor circuitry to implement an automatically evolving code recommendation engine.

FIG. 2 is a flowchart representative of example machine readable instructions and/or example operations that may be executed and/or instantiated by processor circuitry to implement an automatically evolving code recommendation engine. The machine readable instructions and/or operations of FIG. 2 begin at block 200, at which the example integrated development environment circuitry 102 collects a user code snippet.

At block 202, the example structured representation determiner circuitry 112 determines a structured representation of the collected user code snippet.

At block 204, the example recommended code snippet generator circuitry 108 generates a recommended code snippet using the structured representation of the user code snippet.

At block 206, the example feedback obtainer circuitry 128 obtains a user-determined code snippet feedback from the user, comparing the recommended code snippet (RCS) to the user code snippet (UCS).

At block 208, the example training dataset storing circuitry 144 stores the code snippet training pair (e.g., the RCS and the UCS) in a training database. At this point the process ends.

Figure 3:
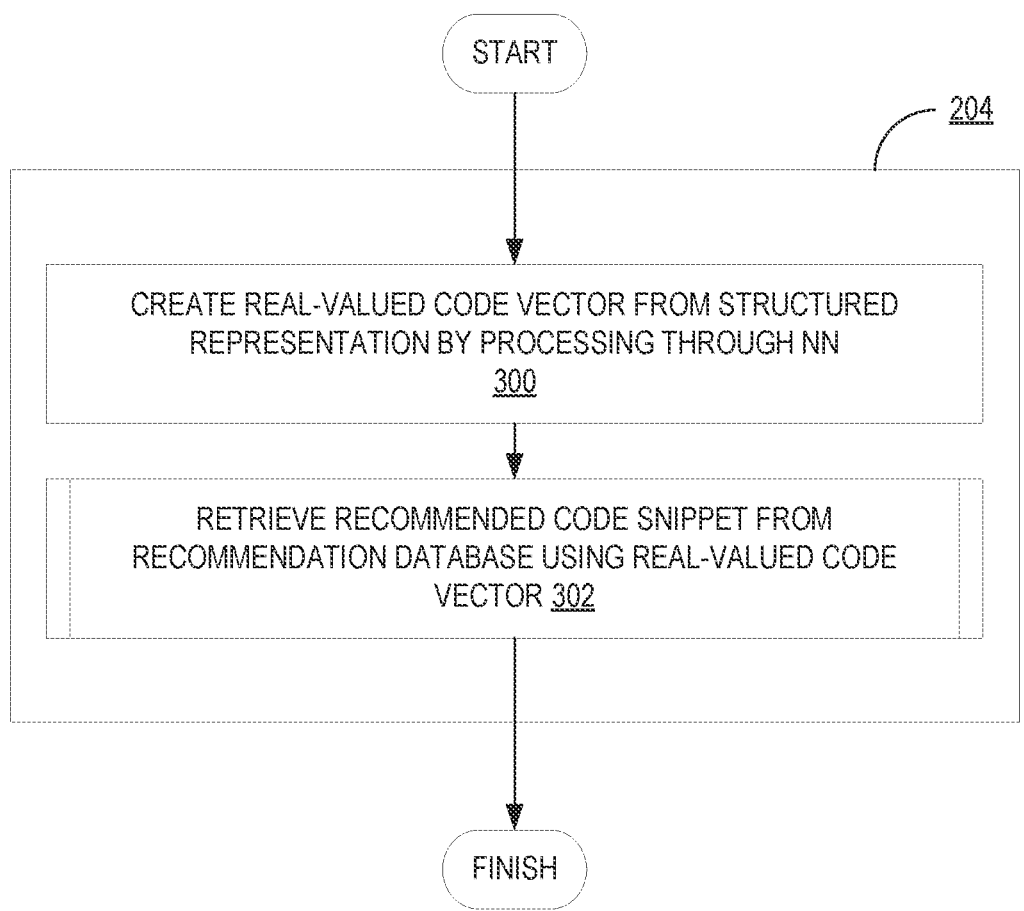
FIG. 3 is a flowchart representative of example machine readable instructions and/or example operations that may be executed and/or instantiated by processor circuitry to implement a process to generate a recommended code snippet using a structured representation.

FIG. 3 is a flowchart representative of example machine readable instructions and/or example operations that may be executed and/or instantiated by processor circuitry to implement a process to generate a recommended code snippet using a structured representation. The machine readable instructions and/or operations of FIG. 3 begin at block 300, at which the example code vector creator circuitry 110 creates a real-valued code vector from the structured representation of the user code snippet by processing the structured representation through a neural network.

At block 302, the example recommended code snippet retriever circuitry 120 retrieves a recommended code snippet from a recommendation database using the real-valued code vector. At this point the process ends.

Figure 4:
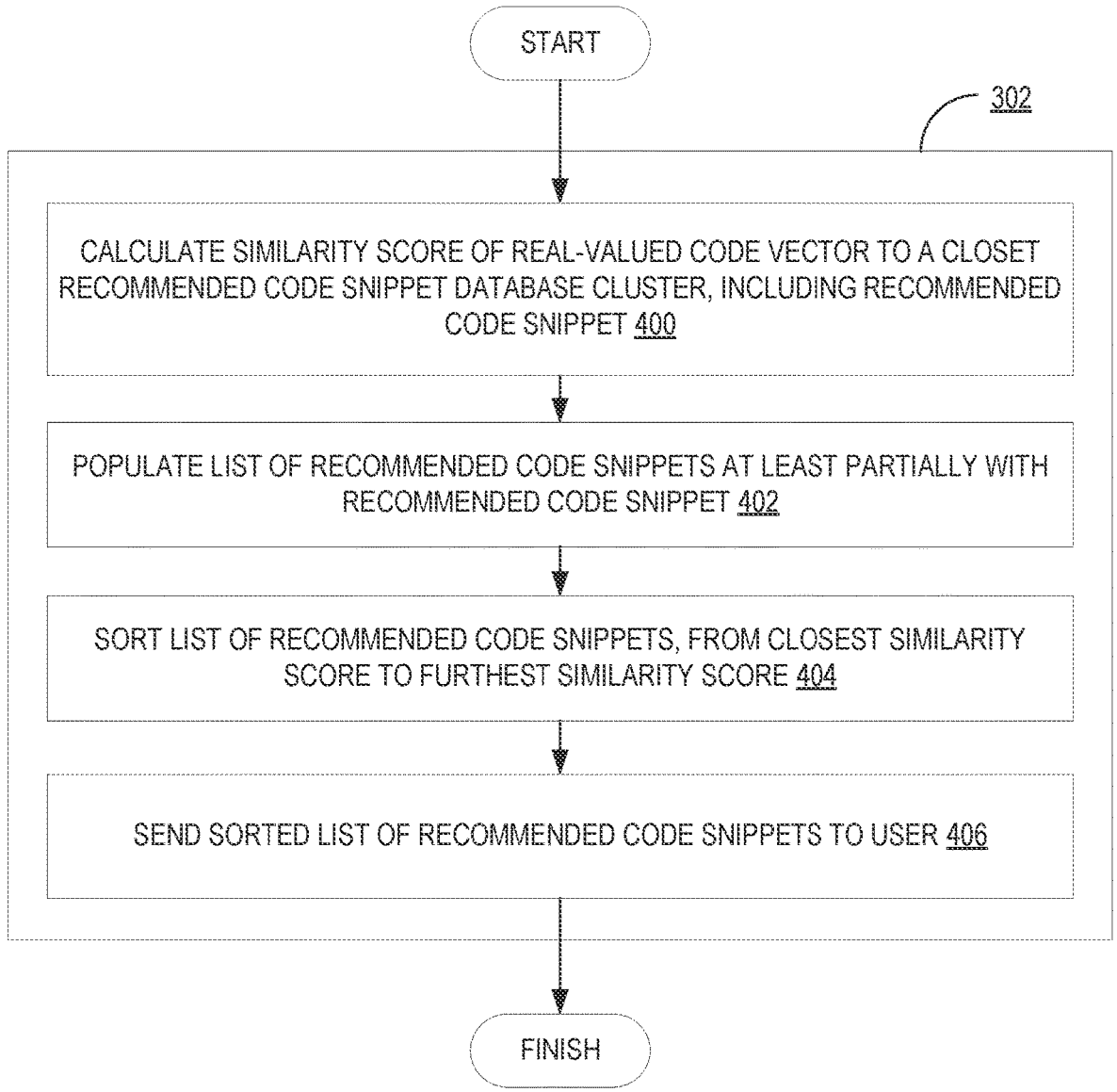
FIG. 4 is a flowchart representative of example machine readable instructions and/or example operations that may be executed and/or instantiated by processor circuitry to implement a process to retrieve a recommended code snippet from a recommendation database using a real-valued code vector.

FIG. 4 is a flowchart representative of example machine readable instructions and/or example operations that may be executed and/or instantiated by processor circuitry to implement a process to retrieve a recommended code snippet from a recommendation database using a real-valued code vector. The machine readable instructions and/or operations of FIG. 4 begin at block 400, at which the example similarity score calculator circuitry 122 calculates a similarity score of the real-valued code vector to a closest recommended code snippet database cluster. In some examples, the closest recommended code snippet database cluster includes the recommended code snippet.

At block 402, the example list populator circuitry 124 populates a list of recommended code snippets at least partially with the recommended code snippet.

At block 404, the example list sorter circuitry 126 sorts the list of recommended code snippets from a code snippet with a closest similarity score to a code snippet with a furthest similarity score.

At block 406, the example feedback obtainer circuitry 128 sends the sorted list of recommended code snippets to the user. In some examples, the sorted list of recommended code snippets may be sent to the IDE circuitry 102 and presented to the user through an IDE user interface. At this point the process ends.

In some examples, an unsupervised sub-linear search algorithm is used to retrieve the list of recommended code snippets from the recommendation database 118. In some examples, the recommendation database 118 has machine-understandable representations (e.g., real-valued vectors) of code that can be classified into sub-groups using clustering algorithms such as k-means. In some examples, representations that are closer to each other, using a distance measurement (e.g. L2-norm), belong to a unique cluster. In some examples, each cluster has a centroid. The example centroid is used to calculate the distance of the cluster to the user code snippet's structured representation. The example recommended code snippet generator circuitry 108 then recommends recommended code snippets (e.g., programs) stored in the recommendation database 118 from clusters that have a small distance from the user code snippet's structured representation.

Figure 5:
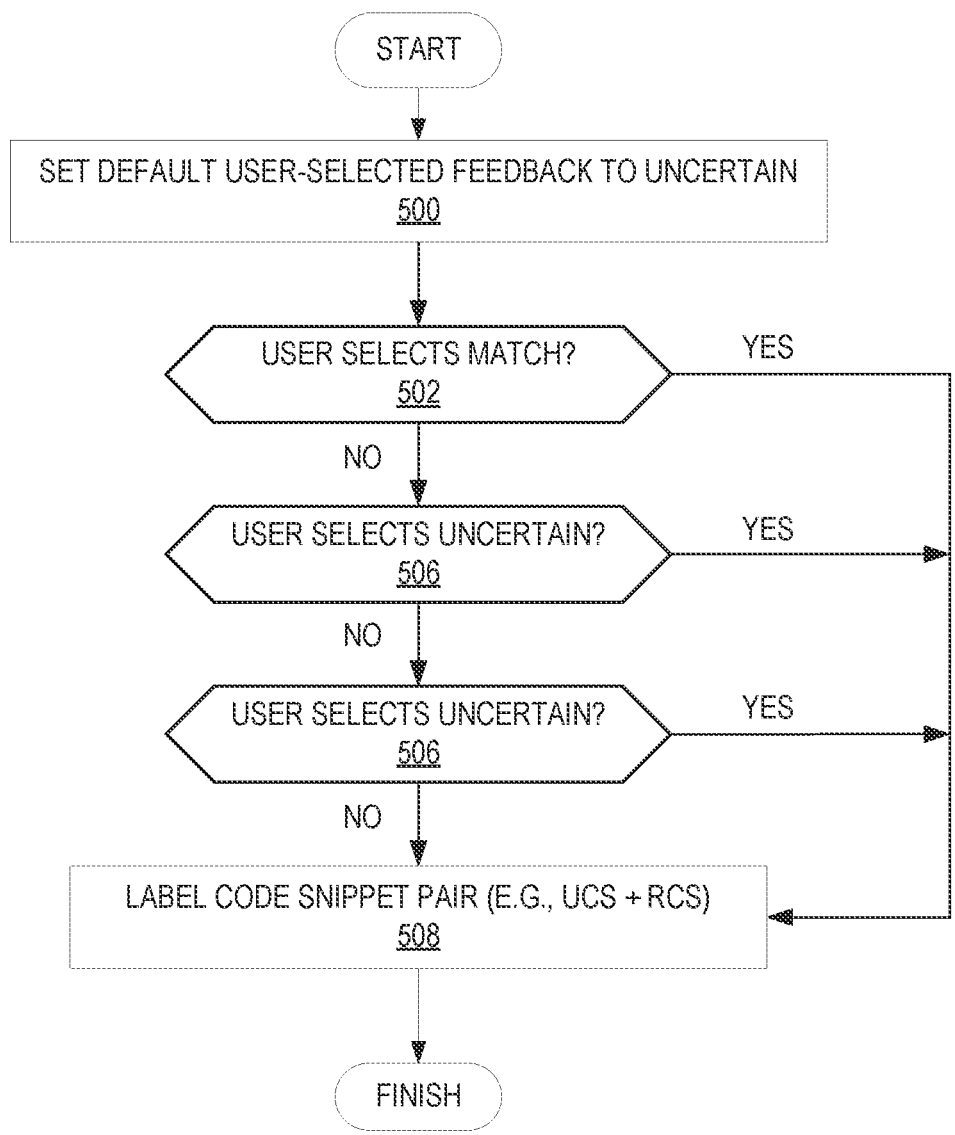
FIG. 5 is a flowchart representative of example machine readable instructions and/or example operations that may be executed and/or instantiated by processor circuitry to implement a process to label a code snippet pair with user-selected feedback.

FIG. 5 is a flowchart representative of example machine readable instructions and/or example operations that may be executed and/or instantiated by processor circuitry to implement a process to label a code snippet pair with user-selected feedback. The machine readable instructions and/or operations of FIG. 5 begin at block 500, at which the example feedback obtainer circuitry 128 sets a default user-selected feedback to UNCERTAIN. In some examples, an UNCERTAIN feedback is equivalent to the user not selecting any feedback (e.g., NO ANSWER).

At block 502, the example feedback obtainer circuitry 128 checks if the user selects a MATCH feedback between the user code snippet and the recommended code snippet. If the user has selected a MATCH feedback, then, at block 508 the example code snippet pair labeler circuitry 130 labels the code snippet pair as a MATCH.

If the user has not selected a MATCH at block 502, then, at block 504, the example feedback obtainer circuitry 128 checks if the user selects a NO MATCH feedback between the user code snippet and the recommended code snippet. If the user has selected a NO MATCH feedback, then, at block 508 the example code snippet pair labeler circuitry 130 labels the code snippet pair as a NO MATCH.

If the user has not selected a NO MATCH at block 504, then, at block 506, the example feedback obtainer circuitry 128 checks if the user selects an UNCERTAIN feedback between the user code snippet and the recommended code snippet. If the user has selected an UNCERTAIN feedback, then, at block 508 the example code snippet pair labeler circuitry 130 labels the code snippet pair as UNCERTAIN.

If the user has not selected any feedback at any of blocks 502, 504, and 506, then, at block 508 then the example code snippet pair labeler circuitry 130 labels the code snippet pair as UNCERTAIN. At this point the process ends.

In some examples, if the code snippet pair can be referred to as a code snippet "training" pair because the code snippet pair may be stored in a training dataset in a training database for downstream model training.

In some examples, the data collected to be stored in the training database is the pair of code snippets including the user code snippet (UCS) and the recommended code snippet (RCS). In some examples, each {RCS, UCS} pair corresponds to one of three categories: 1) a positive pair, 2) a negative pair, and 3) an uncertain pair. A positive pair is defined as a semantically similar pair, a negative pair is defined as a semantically dissimilar pair, and an uncertain pair is defined as showing the user ignores or is unsure about the RCS.

In some examples, given a UCS, the recommended code snippet retriever circuitry 120, in concert with the feedback obtainer circuitry 128, provides a sorted list of recommended code snippets. When paired with the user code snippet, an example list may be written as {RCS1, UCS}, {RCS2, UCS}, . . . {RCSn, UCS}, where n is the number of RCS in the list. In some examples, the smaller numbers in the list indicate more confident recommendations. For example, the recommended code snippet in the recommendation database with the smallest distance metric from the user code snippet's code vector would be listed as RCS1, otherwise considered and referred to as the RCS the recommended code snippet retriever circuitry 120 is most confident about.

In some examples, for each RCS in a recommended list, a user can mark one of the states from the list [MATCH, NO MATCH, UNCERTAIN]. In some examples, the code snippet pair labeler circuitry 130 may simplify the labeling of a given code snippet pair by labeling each code snippet pair with number in the range of 0 to 1. In some examples, when the user selects a MATCH, the code snippet pair labeler circuitry 130 labels (e.g., assigns) the code snippet pair (e.g., {RCSn, UCS}) with a value of 1. In some examples, when the user selects a NO MATCH, the code snippet pair labeler circuitry 130 labels the code snippet pair with a value of 0. If a user selects RCSm as the answer from the list of recommended code snippets, where m is the position of the selected code snippet in the list, in some examples, the code snippet pair labeler circuitry 130 assigns a value of less than the similarity score between {RCSm, UCS} to the uncertain pairs before m (e.g., values between but not including 0 and 1). In these examples, the remaining uncertain pairs with an RCS greater than m will be ignored. In some examples, if the user did not select a solution from the list (i.e., the user feedback is UNCERTAIN), all uncertain pairs will be ignored.

Figure 6:
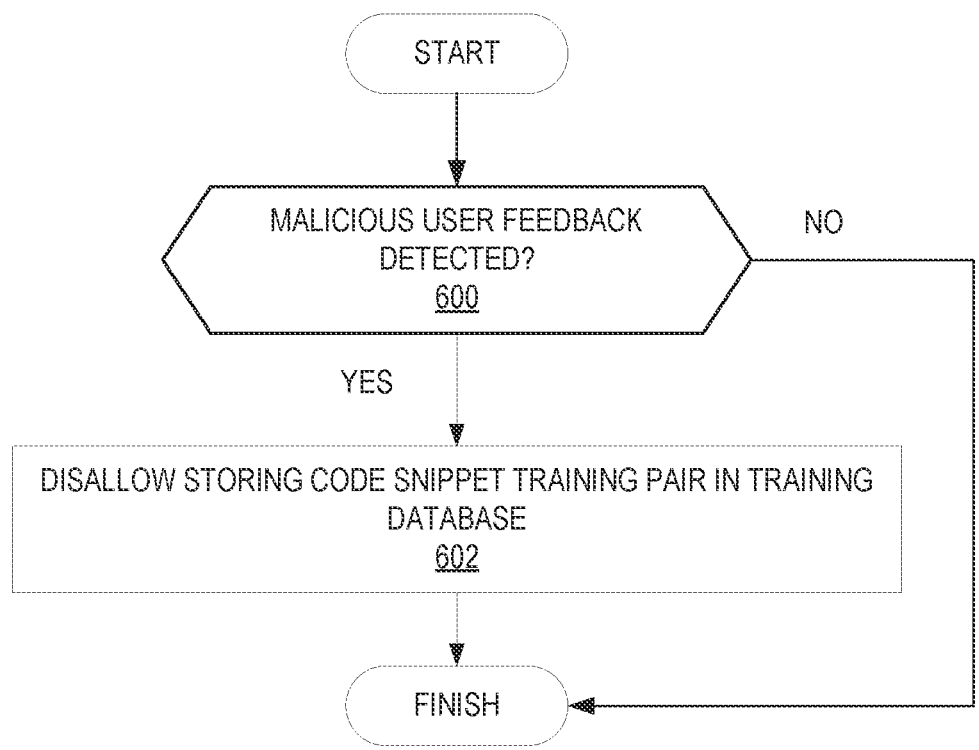
FIG. 6 is a flowchart representative of example machine readable instructions and/or example operations that may be executed and/or instantiated by processor circuitry to implement a process to detect and handle malicious user feedback for a code snippet pair.

FIG. 6 is a flowchart representative of example machine readable instructions and/or example operations that may be executed and/or instantiated by processor circuitry to implement a process to detect and handle malicious user feedback for a code snippet pair. The machine readable instructions and/or operations of FIG. 6 begin at block 600, at which the example malicious user feedback detector circuitry 136 determines if malicious user feedback for a given code snippet pair has been detected.

If malicious user feedback has been detected, then at block 602, the example malicious user feedback handler circuitry 138 disallows storing the code snippet training pair in the training database. At this point the process ends.

In some examples, when a user (e.g., user 100) takes an action (e.g., selects or ignores a recommended code snippet), the recommended code snippet generator circuitry 108 creates a list of labeled data pairs. The example malicious user control circuitry 134 and, more specifically, the example malicious user feedback detector circuitry 136, then detects if there are any data that is maliciously created by the user 100 to fool the system. For example, code snippet pairs generated by the user 100 intentionally choosing an inappropriate recommendation is a malicious user-recommended feedback.

As described above, the malicious user feedback detection includes two phases: 1) manual detection, and 2) learned detection. In some examples, the manual detection phase utilizes humans to inspect code pairs produced by users' actions to create an initial dataset. In some examples, the manual phase only lasts for a certain amount of time (e.g., 6 months). At the end of the manual phase, in some examples, a database of human-labeled benign and malicious code pairs are present. The example malicious user feedback detector circuitry 136 then utilizes the dataset during the learned (automated) detection phase to learn a classifier to detect malicious code pairs. Specifically, in some examples, the example malicious user feedback detector circuitry 136 can use machine learning models (e.g., MISIM, ControlFlag, etc.) that learn patterns of malicious code pairs. The example malicious user feedback detector circuitry 136 utilizes one or more of the machine-learning models to take a code snippet pair as an input and produces a binary-valued output that indicates if the code snippet pair is malicious.

Figure 7:
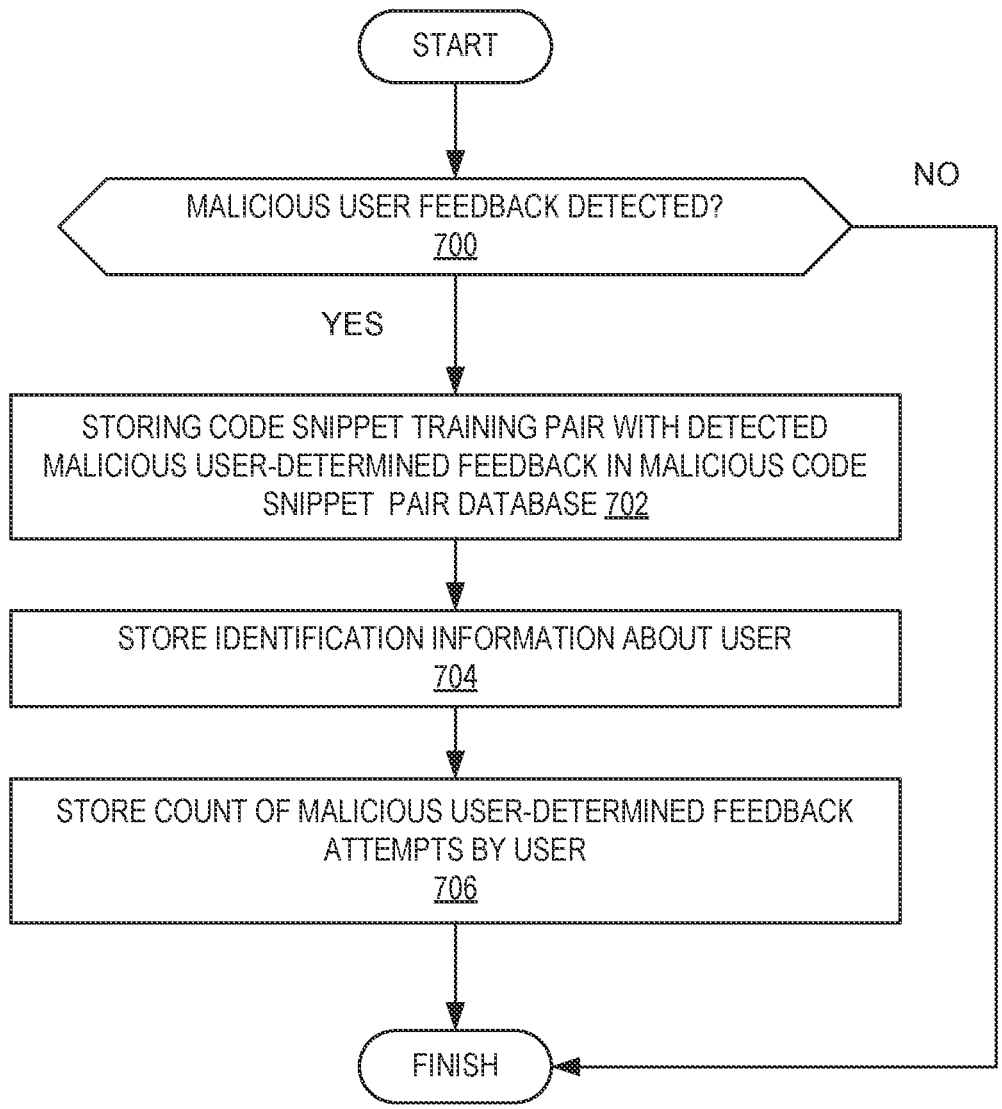
FIG. 7 is a flowchart representative of example machine readable instructions and/or example operations that may be executed and/or instantiated by processor circuitry to implement another process to detect and handle malicious user feedback for a code snippet pair.

FIG. 7 is a flowchart representative of example machine readable instructions and/or example operations that may be executed and/or instantiated by processor circuitry to implement another process to detect and handle malicious user feedback for a code snippet pair. The machine readable instructions and/or operations of FIG. 7 begin at block 700, at which the example malicious user feedback detector circuitry 136 determines if malicious user feedback for a given code snippet pair has been detected.

If malicious user feedback has been detected, then at block 702, the example malicious user data storing circuitry 140 stores the code snippet training pair with the detected malicious user-determined feedback in a malicious code snippet pair database.

At block 704, the example malicious user data storing circuitry 140 stores identification information about the user that provided the malicious user-determined feedback in the malicious code snippet pair database.

At block 706, the example malicious user data storing circuitry 140 stores a count of malicious user-determined feedback attempts by the user in the malicious code snippet pair database. At this point the process ends.

Figure 8:
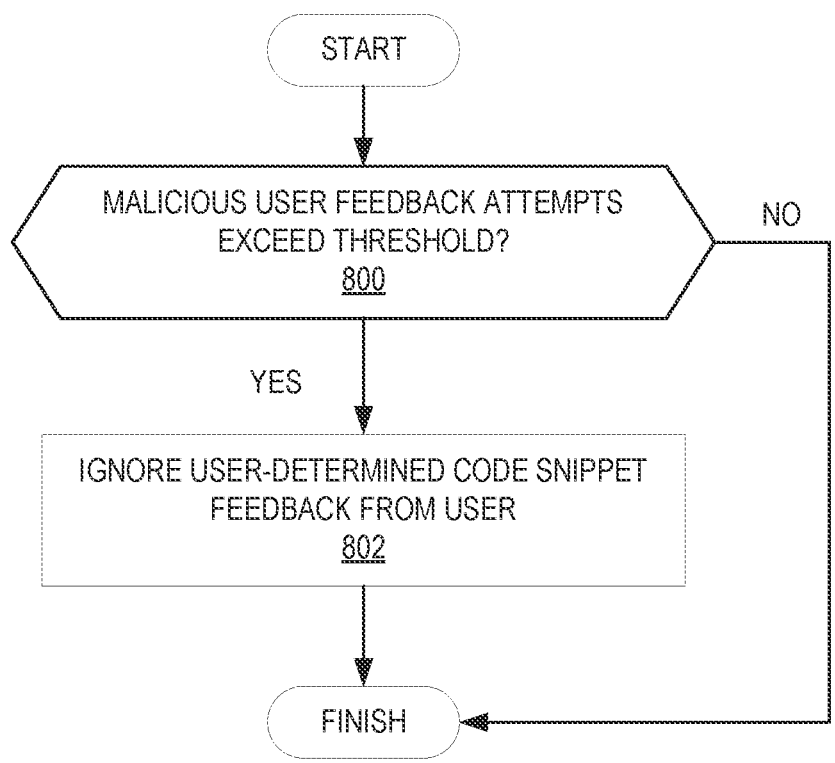
FIG. 8 is a flowchart representative of example machine readable instructions and/or example operations that may be executed and/or instantiated by processor circuitry to implement a process to handle a user that has a number of attempts of malicious user feedback that exceed a threshold.

FIG. 8 is a flowchart representative of example machine readable instructions and/or example operations that may be executed and/or instantiated by processor circuitry to implement a process to handle a user that has a number of attempts of malicious user feedback that exceed a threshold. The machine readable instructions and/or operations of FIG. 8 begin at block 800, at which the example malicious user feedback handler circuitry 138 determines if malicious user-determined feedback attempts from a user has exceeded a threshold number of attempts.

If the number of malicious user-determined feedback attempts by the user has exceeded the threshold, then, at block 802, the example malicious user feedback handler circuitry 138 ignores the user-determined code snippet feedback from the user. At this point the process ends.

In some examples, a user credibility ranking system is implemented by the example malicious user feedback handler circuitry 138. In some examples, the example malicious user feedback handler circuitry 138 may use the malicious user detection process described above in the discussion regarding FIGS. 6-8 to dynamically update a user's credibility. In some examples, the example malicious user feedback handler circuitry 138 additionally utilizes environmental meta-data help determine user credibility.

In some examples, if a code snippet pair selected by a user (e.g., user 100) is detected and marked/labeled as malicious, then the example malicious user feedback handler circuitry 138 decreases the credibility of that user. On the other hand, if the user-selected code snippet pair is benign, then the example malicious user feedback handler circuitry 138 increases the credibility of the user.

In some examples, the credibility of a user is determined by a count of malicious user-determined feedback events by that user. In some examples, the example malicious user feedback handler circuitry 138 keeps a dynamic tally of the count of malicious feedback attempts and if the count exceeds a threshold value, the example malicious user feedback handler circuitry 138 ignores further feedback from the user. In some examples, malicious feedback increases the count and benign feedback reduces the count, thus the current dynamic count can be monitored by the example malicious user feedback handler circuitry 138 over time and the feedback from the user is utilized whenever the count is at or below the threshold or ignored when the count exceeds the threshold.

In other examples, the example malicious user feedback handler circuitry 138 may utilize the count of malicious user feedback attempts for a given user as a weight when considering the user's current feedback. For example, when the malicious user feedback count for a given user is high, the significance of feedback from that user is low, and vice versa, when the malicious user feedback count for a given user is low, the significance of feedback from that user is high.

The user credibility process implemented by the example malicious user feedback handler circuitry 138 learns over time to put less trust in users who select malicious code pairs and to put more trust in users who continue to select benign code pairs. In some examples, the malicious user feedback handler circuitry 138 stores a trustworthiness score for each known user in the malicious code snippet pair database 142. The example malicious user feedback handler circuitry 138 begins with a fixed initial trustworthiness score for all users and the trustworthiness score is update periodically (e.g., each time the code similarity engine circuitry 106 is trained/updated). In some examples, if a user has several malicious actions in during this period, the user's score decreases by some configurable number. Once a user's score is below a pre-determined threshold, the example malicious user feedback handler circuitry 138 no longer collects data from such users (i.e., ignores the user's feedback and/or disallows storing a code snippet pair with a label from the user). In other examples, the example malicious user feedback handler circuitry 138 updates the user trustworthiness score in real-time each time a code snippet pair is processed.

Figure 9:
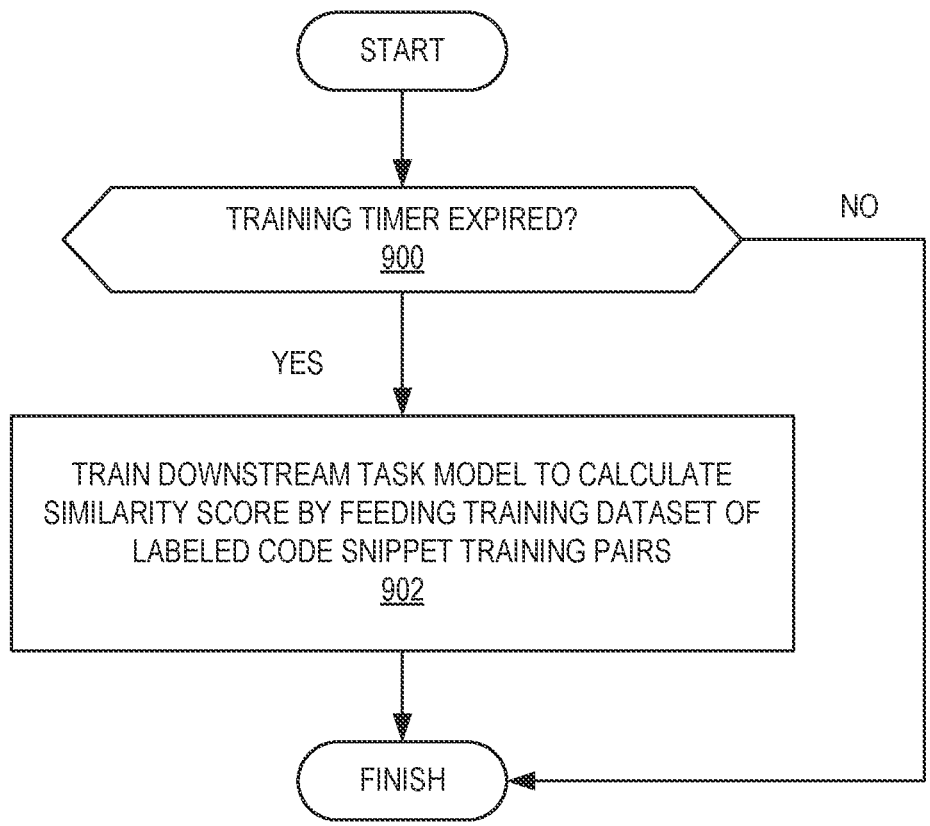
FIG. 9 is a flowchart representative of example machine readable instructions and/or example operations that may be executed and/or instantiated by processor circuitry to implement a process to train a downstream task model.

FIG. 9 is a flowchart representative of example machine readable instructions and/or example operations that may be executed and/or instantiated by processor circuitry to implement a process to train a downstream task model. The machine readable instructions and/or operations of FIG. 9 begin at block 900, at which the example training dataset sending circuitry 148 determines if a training timer has expired.

If the training timer has expired, then, at block 902, the example training dataset sending circuitry 148 trains the downstream task model (e.g., the neural network downstream task model circuitry) to calculate similarity scores by feeding the training dataset of labeled code snippet training pairs, stored in the training database, to the code similarity engine circuitry 106. At this point the process ends.

In some examples, the neural network downstream task model circuitry can be trained at different training periods to improve code similarity determination accuracy (e.g., once a week, once a month, once every three months, etc.). In some examples, the neural network downstream task model circuitry 116 uses weights from the neural network pre-task model circuitry 114. In some examples, every training period (e.g., 3 months), the neural network downstream task model circuitry 116 can be trained as a binary classification problem (e.g., to predict if a code snippet pair is semantically equivalent) on the accumulated dataset (stored in the training database 146) collected from users. Once the example neural network downstream task model circuitry 116 is trained, the example downstream task model training circuitry 132 employs a continuous integration and continuous deployment pipeline implemented to automatically deploy the example neural network downstream task model circuitry 116. In some examples, the deployment of the neural network downstream task model circuitry 116 takes place once each training (block 902) completes.

Figure 10:
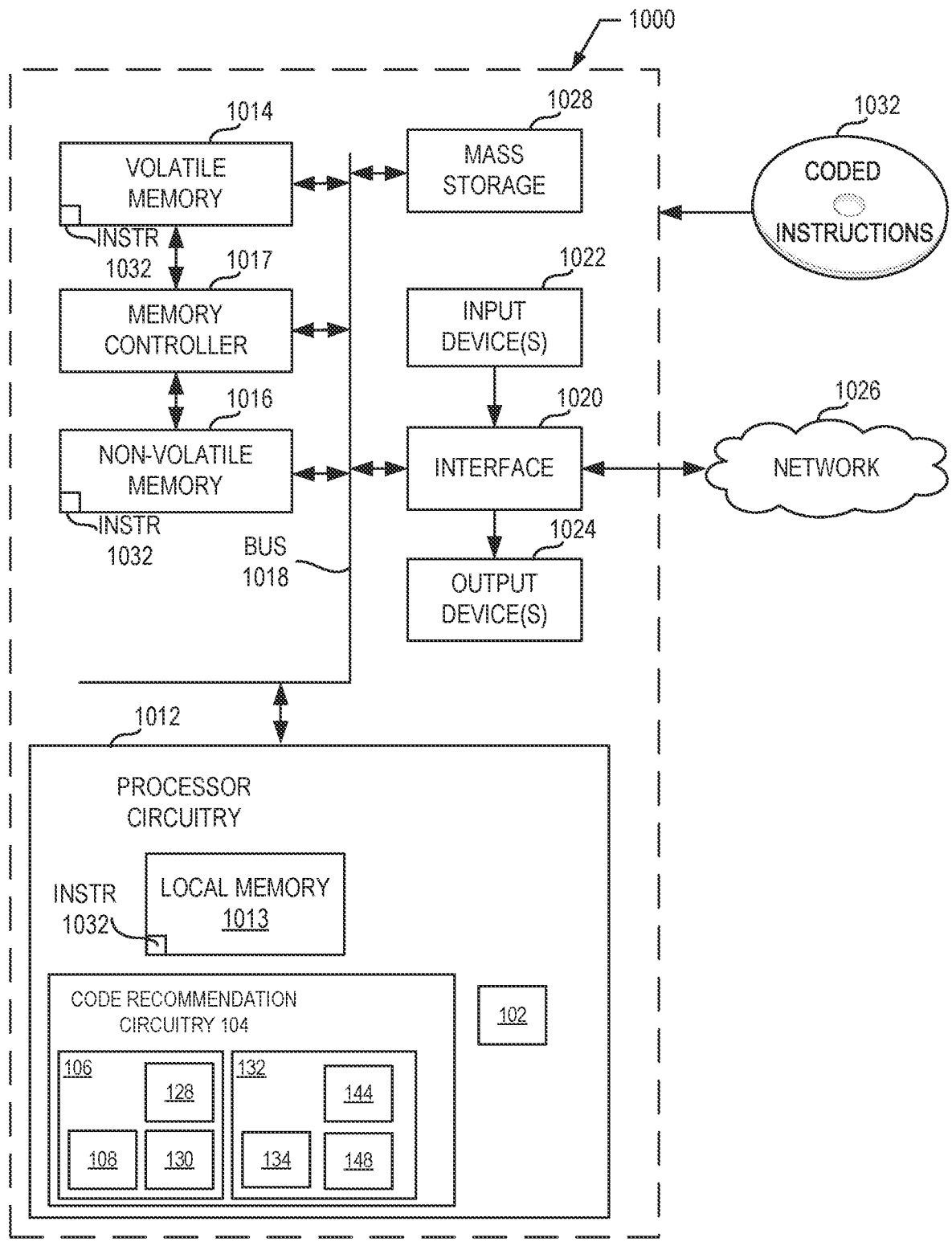
FIG. 10 is a block diagram of an example processor platform 1000 structured to execute and/or instantiate the machine readable instructions and/or operations of FIGS. 2-9 to implement the apparatus of FIG. 1.

FIG. 10 is a block diagram of an example processor platform 1000 structured to execute and/or instantiate the machine readable instructions and/or operations of FIGS. 2-9 to implement the apparatus of FIG. 1. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example integrated development environment circuitry 102, the example code similarity engine circuitry 106, the example recommended code snippet generator circuitry 108, the example code vector creator circuitry 110, the example structured representation determiner circuitry 112, the example neural network pre-task model circuitry 114, the example neural network downstream task model circuitry 116, the example recommended code snippet retriever circuitry 120, the example similarity score calculator circuitry 122, the example list populator circuitry 124, the example list sorter circuitry 126, the example feedback obtainer circuitry 128, the example code snippet pair labeler circuitry 130, the example downstream task model training circuitry 132, the example malicious user control circuitry 134, the example malicious user feedback detector circuitry 136, the example malicious user feedback handler circuitry 138, the example malicious user data storing circuitry 140, the example training dataset storing circuitry 144, the example training dataset sending circuitry 148, and/or, more generally, the example code recommendation circuitry of FIG. 1.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine readable instructions of FIGS. 2-9, may be stored in the mass storage device 1028, in the volatile memory 1014, in the non-volatile memory 1016, and/or on a removable non-transitory computer readable storage medium such as a CD or DVD.

Figure 11:
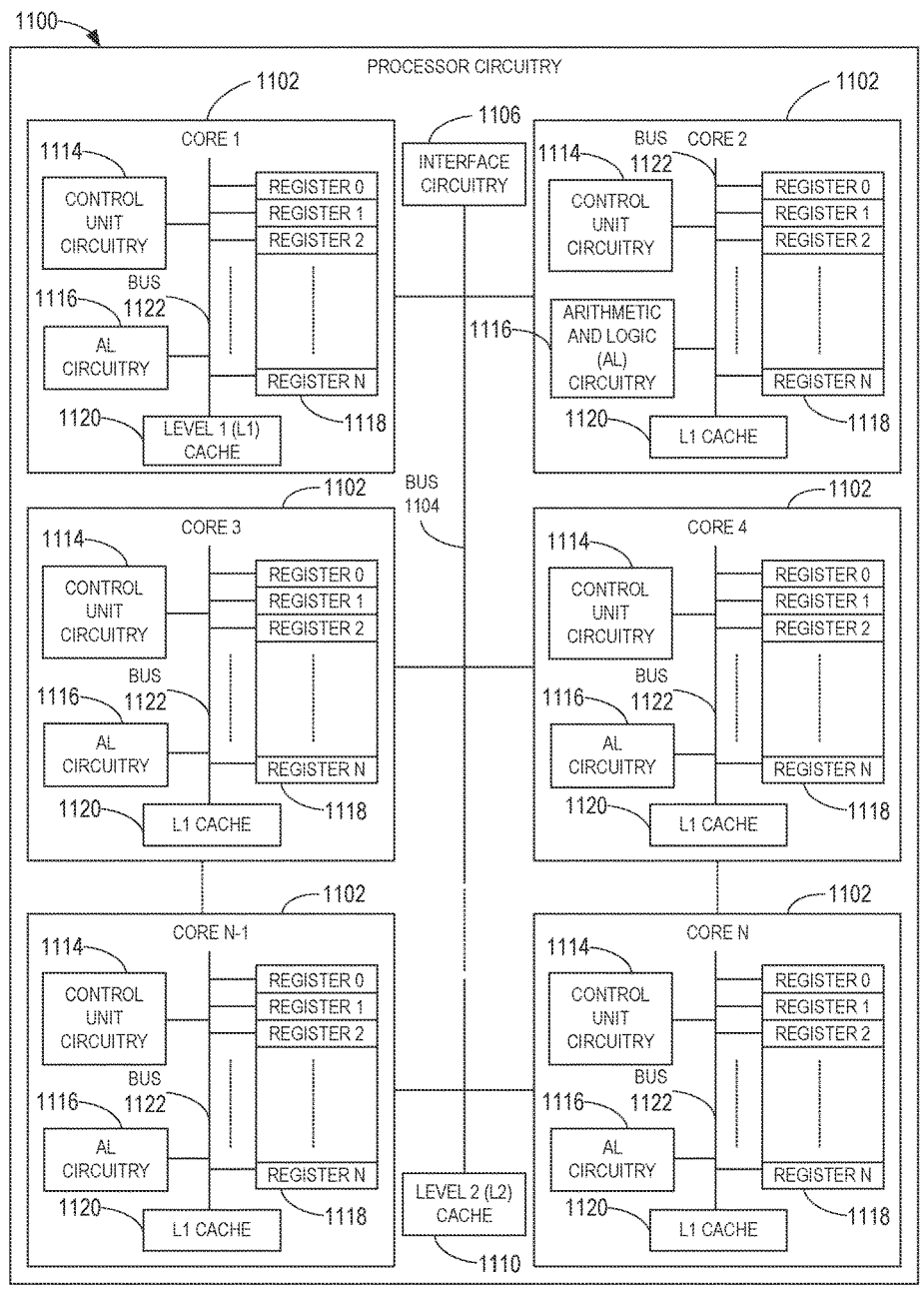
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a microprocessor 1100. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 2-9.

The cores 1102 may communicate by an example bus 1104. In some examples, the bus 1104 may implement a communication bus to effectuate communication associated with one(s) of the cores 1102. For example, the bus 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The bus 1120 may implement at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
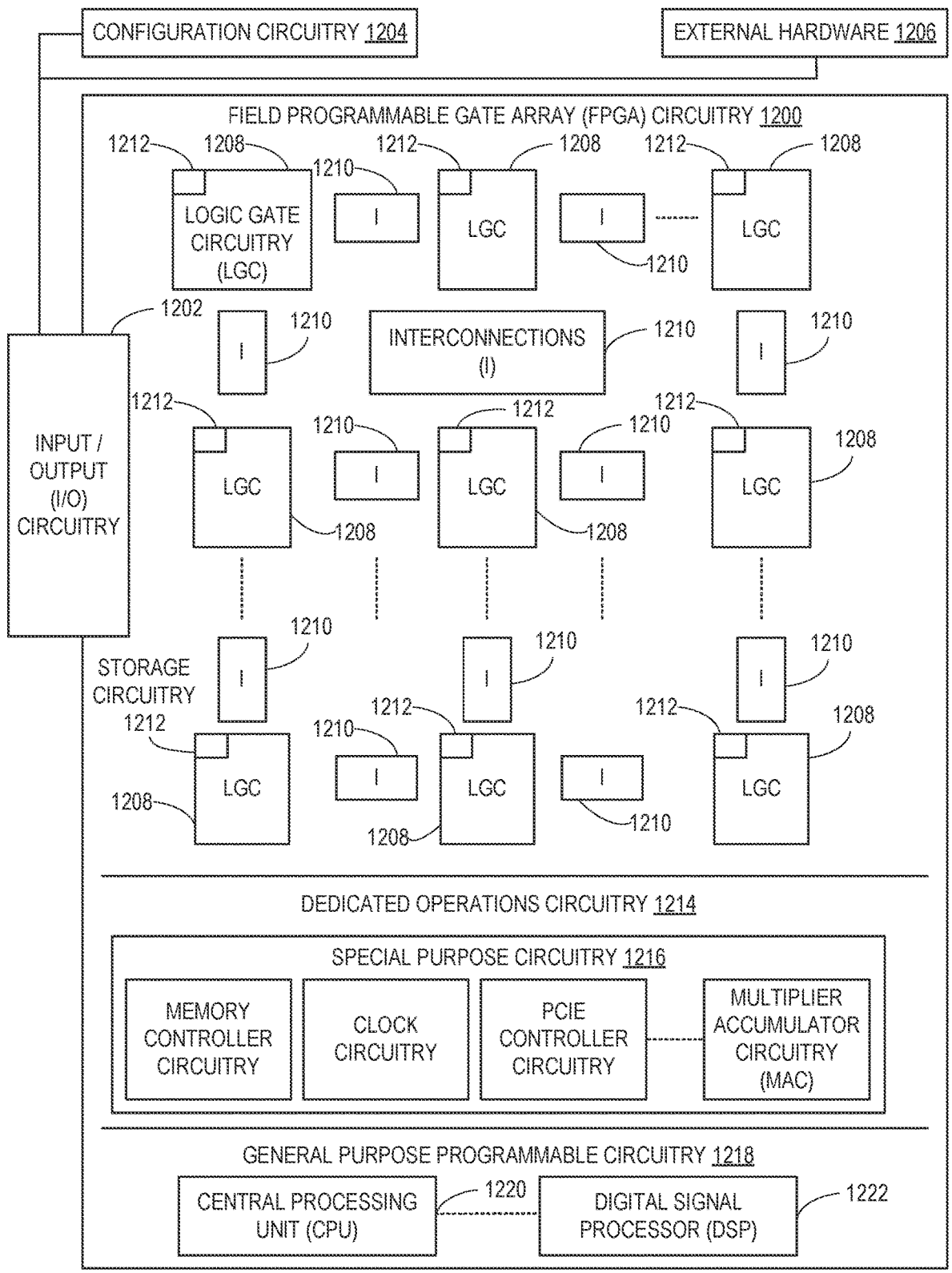
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 2-9 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 2-9. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 2-9. As such, the FPGA circuitry 1200 may be structured to effectively instantiate some or all of the machine readable instructions of the flowcharts of FIGS. 2-9 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 2-9 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIGS. 2-9 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 2-9 may be executed by one or more of the cores 1102 of FIG. 11 and a second portion of the machine readable instructions represented by the flowcharts of FIGS. 2-9 may be executed by the FPGA circuitry 1200 of FIG. 12.

In some examples, the processor circuitry 1012 of FIG. 10 may be in one or more packages. For example, the processor circuitry 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
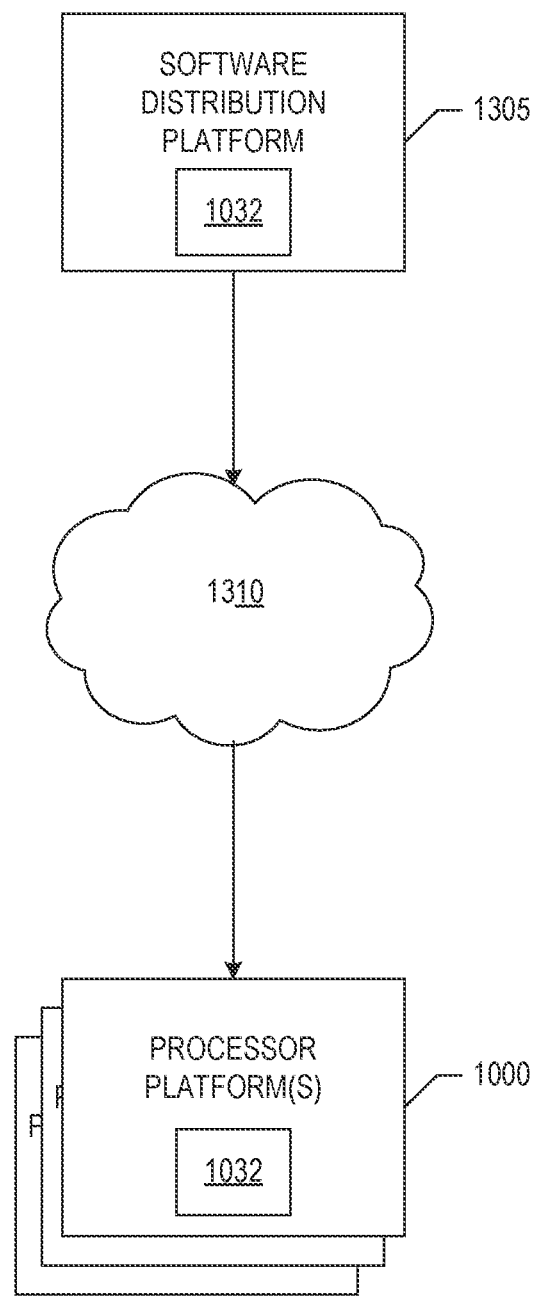
FIG. 13 is a block diagram of an example software distribution platform (e.g., one or more servers) to distribute software (e.g., software corresponding to the example machine readable instructions of FIGS. 2-9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 1032, which may correspond to the example machine readable instructions 200, 300, 400, 500, 600, 700, 800, and 900 of FIGS. 2-9, as described above. The one or more servers of the example software distribution platform 1305 are in communication with a network 1310, which may correspond to any one or more of the Internet and/or any of the example networks 1010 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions 200, 300, 400, 500, 600, 700, 800, and 900 of FIGS. 2-9, may be downloaded to the example processor platform 1000, which is to execute the machine readable instructions 1032 to implement the code recommendation circuitry 104. In some example, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices.

From the foregoing, it will be appreciated that example systems, methods, apparatus, and articles of manufacture have been disclosed that implement an automatically evolving code recommendation engine (e.g., circuitry, logic). The disclosed systems, methods, apparatus, and articles of manufacture improve the efficiency of using a computing device by implementing an automatically evolving code recommendation circuitry. The code recommendation circuitry utilizes user input to help classify recommended code snippets as to whether they match against a user-inputted code snippet. The process removes a large amount of overhead involved in classifying code snippets by hand in advance of deployment of the system. The disclosed systems, methods, apparatus, and articles of manufacture are accordingly directed to one or more improvement(s) in the operation of a machine such as a computer or other electronic and/or mechanical device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

Example 1 includes an apparatus to implement an evolving code recommendation engine, comprising interface circuitry to collect a user code snippet, and processor circuitry including one or more of at least one of a central processing unit, a graphic processing unit or a digital signal processor, the at least one of the central processing unit, the graphic processing unit or the digital signal processor having control circuitry, arithmetic and logic circuitry, and one or more registers, the processor circuitry to execute instructions to determine a structured representation of the user code snippet, generate a recommended code snippet using the structured representation of the user code snippet, obtain, via the interface circuitry, user-determined code snippet feedback comparing the user code snippet to the recommended code snippet, the user-determined code snippet feedback indicating one of a match, no match, or uncertain, and cause storage of a code snippet training pair in a training database, the code snippet training pair including the user code snippet and the recommended code snippet.

Example 2 includes the apparatus of example 1, wherein the interface circuitry is to present the recommended code snippet to a user.

Example 3 includes the apparatus of example 1, wherein the processor circuitry is to create a real-valued code vector from the structured representation of the user code snippet by processing the structured representation of the user code snippet through a neural network, and retrieve the recommended code snippet from a recommendation database using the real-valued code vector.

Example 4 includes the apparatus of example 3, wherein the processor circuitry is to calculate a similarity score of the real-valued code vector to a closest recommended code snippet database cluster using a distance metric, the closest recommended code snippet database cluster including the recommended code snippet, populate a list of recommended code snippets at least partially with the recommended code snippet, and sort the list of recommended code snippets with a most confident recommended code snippet with a closest similarity score first to a least confident recommended code snippet with a furthest similarity score last.

Example 5 includes the apparatus of example 4, wherein the processor circuitry is to for a first user-selected recommended code snippet in the list of recommended code snippets, label the code snippet training pair including the first recommended code snippet with a label score of one, in response to the user-determined code snippet feedback being a match for the first recommended code snippet, label all code snippet training pairs that include any of the recommended code snippets in the list of recommended code snippets with a closer similarity score than the first recommended code snippet with a label score of less than one, and not label any code snippet training pairs that include any of the recommended code snippets in the list of recommended code snippets in response to the user-determined code snippet feedback being a no answer for the first recommended code snippet.

Example 6 includes the apparatus of example 1, wherein the processor circuitry is to label the code snippet training pair with a score of one in response to the user-determined code snippet feedback being a match and label the code snippet training pair with a score of zero in response to the user-determined code snippet feedback being a no match.

Example 7 includes the apparatus of example 1, further including the processor circuitry to detect malicious user-determined code snippet feedback from a user, and disallow storing the code snippet training pair in the training database in response to detecting malicious user-determined code snippet feedback.

Example 8 includes the apparatus of example 7, wherein the processor circuitry is to cause storage of the code snippet training pair with the detected malicious user-determined code snippet feedback in a malicious code snippet pair database, cause storage of identification information about the user, and cause storage of a count of malicious user-determined code snippet feedback attempts by the user.

Example 9 includes the apparatus of example 8, wherein the processor circuitry is to ignore user-determined code snippet feedback from the user in response to the count of malicious user-determined code snippet feedback attempts exceeding a threshold.

Example 10 includes the apparatus of example 4, wherein the processor circuitry is to train a downstream task model to calculate the similarity score by feeding the downstream task model a training dataset of the code snippet training pair in the training database.

Example 11 includes At least one non-transitory computer-readable storage medium comprising instructions that, when executed, cause one or more processors of a machine to at least collect a user code snippet, determine a structured representation of the user code snippet, generate a recommended code snippet using the structured representation of the user code snippet, obtain user-determined code snippet feedback comparing the user code snippet to the recommended code snippet, the user-determined code snippet feedback indicating one of a match, no match, or uncertain, and cause the storage of a code snippet training pair in a training database, the code snippet training pair including the user code snippet and the recommended code snippet.

Example 12 includes the at least one non-transitory computer-readable storage medium of example 11, wherein the instructions, when executed, cause the one or more of the processors of the machine to present the recommended code snippet to a user in an integrated development environment.

Example 13 includes the at least one non-transitory computer-readable storage medium of example 11, wherein the instructions, when executed, cause the one or more of the processors of the machine to create a real-valued code vector from the structured representation of the user code snippet by processing the structured representation of the user code snippet through a neural network, and retrieve the recommended code snippet from a recommendation database using the real-valued code vector.

Example 14 includes the at least one non-transitory computer-readable storage medium of example 13, wherein the instructions, when executed, cause the one or more of the processors of the machine to calculate a similarity score of the real-valued code vector to a closest recommended code snippet database cluster using a distance metric, the closest recommended code snippet database cluster including the recommended code snippet, populate a list of recommended code snippets at least partially with the recommended code snippet, and sort the list of recommended code snippets with a most confident recommended code snippet with a closest similarity score first to a least confident recommended code snippet with a furthest similarity score last.

Example 15 includes the at least one non-transitory computer-readable storage medium of example 14, wherein the instructions, when executed, cause the one or more of the processors of the machine to for a first user-selected recommended code snippet in the list of recommended code snippets, label the code snippet training pair including the first recommended code snippet with a label score of one, in response to the user-determined code snippet feedback being a match for the first recommended code snippet, label all code snippet training pairs that include any of the recommended code snippets in the list of recommended code snippets with a closer similarity score than the first recommended code snippet with a label score of less than one, and not label any code snippet training pairs that include any of the recommended code snippets in the list of recommended code snippets in response to the user-determined code snippet feedback being a no answer for the first recommended code snippet example Example 16 includes the at least one non-transitory computer-readable storage medium of example 11, wherein the instructions, when executed, cause the one or more of the processors of the machine to label the code snippet training pair with a score of one in response to the user-determined code snippet feedback being a match and labeling the code snippet training pair with a score of zero in response to the user-determined code snippet feedback being a no match.

Example 17 includes the at least one non-transitory computer-readable storage medium of example 11, wherein the instructions, when executed, cause the one or more of the processors of the machine to detect malicious user-determined code snippet feedback from a user, and disallow the storing the code snippet training pair in the training database in response to detecting malicious user-determined code snippet feedback.

Example 18 includes the at least one non-transitory computer-readable storage medium of example 17, wherein the instructions, when executed, cause the one or more of the processors of the machine to, cause the storage of the code snippet training pair with the detected malicious user-determined code snippet feedback in a malicious code snippet pair database, cause the storage of identification information about the user, and cause the storage of a count of malicious user-determined code snippet feedback attempts by the user.

Example 19 includes the at least one non-transitory computer-readable storage medium of example 18, wherein the instructions, when executed, cause the one or more of the processors of the machine to ignore user-determined code snippet feedback from the user in response to the count of malicious user-determined code snippet feedback attempts exceeding a threshold.

Example 20 includes the at least one non-transitory computer-readable storage medium of example 14, wherein the instructions, when executed, cause the one or more of the processors of the machine to train a downstream task model to calculate the similarity score by feeding the downstream task model a training dataset of the code snippet training pair in the training database.

Example 21 includes an apparatus comprising processor circuitry including one or more of at least one of a central processor unit, a graphic processor unit or a digital signal processor, the at least one of the central processor unit, the graphic processor unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or an Application Specific Integrated Circuitry (ASIC) including logic gate circuitry to perform one or more third operations, the processor circuitry to perform at least one of the one or more first operations, the one or more second operations or the one or more third operations to instantiate an integrated development environment circuitry to collect a user code snippet, a structured representation determiner circuitry to determine a structured representation of the user code snippet, a recommended code snippet generator circuitry to generate a recommended code snippet using the structured representation of the user code snippet, a feedback obtainer circuitry to obtain user-determined code snippet feedback comparing the user code snippet to the recommended code snippet, the user-determined code snippet feedback indicating one of a match, no match, or uncertain, and a training dataset storing circuitry to store a code snippet training pair in a training database, the code snippet training pair including the user code snippet and the recommended code snippet.

Example 22 includes the apparatus of example 21, wherein the processor circuitry to perform at least one of the one or more first operations, the one or more second operations or the one or more third operations to instantiate the integrated development environment to present the recommended code snippet to a user.

Example 23 includes the apparatus of example 21, wherein the processor circuitry to perform at least one of the one or more first operations, the one or more second operations or the one or more third operations to instantiate a code vector creator circuitry to create a real-valued code vector from the structured representation of the user code snippet by processing the structured representation of the user code snippet through a neural network, and a recommended code snippet retriever circuitry to retrieve the recommended code snippet from a recommendation database using the real-valued code vector.

Example 24 includes the apparatus of example 23, wherein the processor circuitry to perform at least one of the one or more first operations, the one or more second operations or the one or more third operations to instantiate a similarity score calculator circuitry to calculate a similarity score of the real-valued code vector to a closest recommended code snippet database cluster using a distance metric, the closest recommended code snippet database cluster including the recommended code snippet, a list populator circuitry to populate a list of recommended code snippets at least partially with the recommended code snippet, and a list sorter circuitry to sort the list of recommended code snippets with a most confident recommended code snippet with a closest similarity score first to a least confident recommended code snippet with a furthest similarity score last.

Example 25 includes the apparatus of example 24, wherein the processor circuitry to perform at least one of the one or more first operations, the one or more second operations or the one or more third operations to instantiate a code snippet pair labeler circuitry to for a first user-selected recommended code snippet in the list of recommended code snippets, label the code snippet training pair including the first recommended code snippet with a label score of one, in response to the user-determined code snippet feedback being a match for the first recommended code snippet, label all code snippet training pairs that include any of the recommended code snippets in the list of recommended code snippets with a closer similarity score than the first recommended code snippet with a label score of less than one, and not label any code snippet training pairs that include any of the recommended code snippets in the list of recommended code snippets in response to the user-determined code snippet feedback being a no answer for the first recommended code snippet example 26 includes the apparatus of example 21, wherein the processor circuitry to perform at least one of the one or more first operations, the one or more second operations or the one or more third operations to instantiate a code snippet pair labeler circuitry to label the code snippet training pair with a score of one in response to the user-determined code snippet feedback being a match and labeling the code snippet training pair with a score of zero in response to the user-determined code snippet feedback being a no match.

Example 27 includes the apparatus of example 21, wherein the processor circuitry to perform at least one of the one or more first operations, the one or more second operations or the one or more third operations to instantiate a malicious user feedback detector circuitry to detect malicious user-determined code snippet feedback from a user, and a malicious user feedback handler circuitry to disallow the storing the code snippet training pair in the training database in response to detecting malicious user-determined code snippet feedback.

Example 28 includes the apparatus of example 27, wherein the processor circuitry to perform at least one of the one or more first operations, the one or more second operations or the one or more third operations to instantiate malicious user data storing circuitry to store the code snippet training pair with the detected malicious user-determined code snippet feedback in a malicious code snippet pair database, store identification information about the user, and store a count of malicious user-determined code snippet feedback attempts by the user.

Example 29 includes the apparatus of example 28, wherein the processor circuitry to perform at least one of the one or more first operations, the one or more second operations or the one or more third operations to instantiate the malicious user feedback handler circuitry to ignore user-determined code snippet feedback from the user in response to the count of malicious user-determined code snippet feedback attempts exceeding a threshold.

Example 30 includes the apparatus of example 24, wherein the processor circuitry to perform at least one of the one or more first operations, the one or more second operations or the one or more third operations to instantiate a training dataset sending circuitry to train a downstream task model to calculate the similarity score by feeding the downstream task model a training dataset of the code snippet training pair in the training database.

Example 31 includes an apparatus to implement an evolving code recommendation engine, comprising integrated development environment circuitry to collect a user code snippet, structured representation determiner instructions, recommended code snippet generator instructions, feedback obtainer instructions, and training dataset storing instructions, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the processor circuitry to execute the structured representation determiner instructions, the recommended code snippet generator instructions, the feedback obtainer instructions, and the training dataset storing instructions to determine a structured representation of the user code snippet, generate a recommended code snippet using the structured representation of the user code snippet, obtain user-determined code snippet feedback comparing the user code snippet to the recommended code snippet, the user-determined code snippet feedback indicating one of a match, no match, or uncertain, and store a code snippet training pair in a training database, the code snippet training pair including the user code snippet and the recommended code snippet.

Example 32 includes the apparatus of example 31, further including the integrated development environment circuitry to present the recommended code snippet to a user.

Example 33 includes the apparatus of example 31, further including code vector creator instructions, recommended code snippet retriever instructions, and the processor circuitry to execute the code vector creator instructions and the recommended code snippet retriever instructions to create a real-valued code vector from the structured representation of the user code snippet by processing the structured representation of the user code snippet through a neural network, and retrieve the recommended code snippet from a recommendation database using the real-valued code vector.

Example 34 includes the apparatus of example 33, further including similarity score calculator instructions, list populator instructions, list sorting instructions, and the processor circuitry to execute the similarity score calculator instructions, the list populator instructions, and the list sorting instructions to calculate a similarity score of the real-valued code vector to a closest recommended code snippet database cluster using a distance metric, the closest recommended code snippet database cluster including the recommended code snippet, populate a list of recommended code snippets at least partially with the recommended code snippet, and sort the list of recommended code snippets with a most confident recommended code snippet with a closest similarity score first to a least confident recommended code snippet with a furthest similarity score last.

Example 35 includes the apparatus of example 34, further including code snippet pair labeler instructions, and the processor circuitry to execute the code snippet pair labeler instructions to for a first user-selected recommended code snippet in the list of recommended code snippets, label the code snippet training pair including the first recommended code snippet with a label score of one, in response to the user-determined code snippet feedback being a match for the first recommended code snippet, label all code snippet training pairs that include any of the recommended code snippets in the list of recommended code snippets with a closer similarity score than the first recommended code snippet with a label score of less than one, and not label any code snippet training pairs that include any of the recommended code snippets in the list of recommended code snippets in response to the user-determined code snippet feedback being a no answer for the first recommended code snippet example 36 includes the apparatus of example 31, further including code snippet pair labeler instructions, and the processor circuitry to execute the code snippet pair labeler instructions to label the code snippet training pair with a score of one in response to the user-determined code snippet feedback being a match and label the code snippet training pair with a score of zero in response to the user-determined code snippet feedback being a no match.

Example 37 includes the apparatus of example 31, further including malicious user feedback detector instructions, malicious user feedback handler instructions, and the processor circuitry to execute the malicious user feedback detector instructions and the malicious user feedback handler instructions to detect malicious user-determined code snippet feedback from a user, and disallow storing the code snippet training pair in the training database in response to detecting malicious user-determined code snippet feedback.

Example 38 includes the apparatus of example 37, further including, malicious user data storing instructions, and the processor circuitry to execute the malicious user data storing instructions to store the code snippet training pair with the detected malicious user-determined code snippet feedback in a malicious code snippet pair database, store identification information about the user, and store a count of malicious user-determined code snippet feedback attempts by the user.

Example 39 includes the apparatus of example 38, further including the processor circuitry to execute the malicious user feedback handler instructions to ignore user-determined code snippet feedback from the user in response to the count of malicious user-determined code snippet feedback attempts exceeding a threshold.

Example 40 includes the apparatus of example 34, further including training dataset sending instructions, and the processor circuitry to execute the training dataset sending instructions to train a downstream task model to calculate the similarity score by feeding the downstream task model a training dataset of the code snippet training pair in the training database.

Example 41 includes a method, comprising collecting a user code snippet, determining a structured representation of the user code snippet, generating a recommended code snippet using the structured representation of the user code snippet, obtaining user-determined code snippet feedback comparing the user code snippet to the recommended code snippet, the user-determined code snippet feedback indicating one of a match, no match, or uncertain, and storing a code snippet training pair in a training database, the code snippet training pair including the user code snippet and the recommended code snippet.

Example 42 includes the method of example 41, further including presenting the recommended code snippet to a user in an integrated development environment.

Example 43 includes the method of example 41, wherein generating the recommended code snippet using the structured representation of the user code snippet further includes creating a real-valued code vector from the structured representation of the user code snippet by processing the structured representation of the user code snippet through a neural network, and retrieving the recommended code snippet from a recommendation database using the real-valued code vector.

Example 44 includes the method of example 43, wherein retrieving the recommended code snippet from the recommendation database further includes calculating a similarity score of the real-valued code vector to a closest recommended code snippet database cluster using a distance metric, the closest recommended code snippet database cluster including the recommended code snippet, populating a list of recommended code snippets at least partially with the recommended code snippet, and sorting the list of recommended code snippets with a most confident recommended code snippet with a closest similarity score first to a least confident recommended code snippet with a furthest similarity score last.

Example 45 includes the method of example 44, further including for a first user-selected recommended code snippet in the list of recommended code snippets, labeling the code snippet training pair including the first recommended code snippet with a label score of one, in response to the user-determined code snippet feedback being a match for the first recommended code snippet, labeling all code snippet training pairs that include any of the recommended code snippets in the list of recommended code snippets with a closer similarity score than the first recommended code snippet with a label score of less than one, and not labeling any code snippet training pairs that include any of the recommended code snippets in the list of recommended code snippets in response to the user-determined code snippet feedback being a no answer for the first recommended code snippet example 46 includes the method of example 41, further including labeling the code snippet training pair with a score of one in response to the user-determined code snippet feedback being a match and labeling the code snippet training pair with a score of zero in response to the user-determined code snippet feedback being a no match.

Example 47 includes the method of example 41, further including detecting malicious user-determined code snippet feedback from a user, and disallowing the storing the code snippet training pair in the training database in response to detecting malicious user-determined code snippet feedback.

Example 48 includes the method of example 47, further including, storing the code snippet training pair with the detected malicious user-determined code snippet feedback in a malicious code snippet pair database, storing identification information about the user, and storing a count of malicious user-determined code snippet feedback attempts by the user.

Example 49 includes the method of example 48, further including ignoring user-determined code snippet feedback from the user in response to the count of malicious user-determined code snippet feedback attempts exceeding a threshold.

Example 50 includes the method of example 44, further including training a downstream task model to calculate the similarity score by feeding the downstream task model a training dataset of the code snippet training pair in the training database. The following claims are hereby incorporated into this Detailed Description by this reference, with each claim standing on its own as a separate embodiment of the present disclosure.

What is claimed is:

1. An apparatus to implement an evolving code recommendation engine, comprising:
   interface circuitry to collect a user code snippet; and
   processor circuitry including one or more of:
      at least one of a central processing unit, a graphic processing unit or a digital signal processor, the at least one of the central processing unit, the graphic processing unit or the digital signal processor having control circuitry, arithmetic and logic circuitry, and one or more registers, the processor circuitry to execute instructions to:
         determine a structured representation of the user code snippet;
         generate a recommended code snippet using the structured representation of the user code snippet;
         obtain, via the interface circuitry, user-determined code snippet feedback from a user comparing the user code snippet to the recommended code snippet, the user-determined code snippet feedback indicating one of a match, no match, or uncertain;
         detect malicious user-determined code snippet feedback from the user;
         in response to detecting the malicious user-determined code snippet feedback from the user, disallow storage of a code snippet training pair in a training database, the code snippet training pair to include the user code snippet and the recommended code snippet; and
         cause storage of the code snippet training pair in the training database.

2. The apparatus of claim 1, wherein the interface circuitry is to present the recommended code snippet to a user.

3. The apparatus of claim 1, wherein the processor circuitry is to:
   create a real-valued code vector from the structured representation of the user code snippet by processing the structured representation of the user code snippet through a neural network; and
   retrieve the recommended code snippet from a recommendation database using the real-valued code vector.

4. The apparatus of claim 3, wherein the processor circuitry is to:
   calculate a similarity score of the real-valued code vector to a closest recommended code snippet database cluster using a distance metric, the closest recommended code snippet database cluster including the recommended code snippet;
   populate a list of recommended code snippets at least partially with the recommended code snippet; and
   sort the list of recommended code snippets with a most confident recommended code snippet with a closest similarity score first to a least confident recommended code snippet with a furthest similarity score last.

5. The apparatus of claim 4, wherein the processor circuitry is to:
   for a first user-selected recommended code snippet in the list of recommended code snippets, label the code snippet training pair including the first recommended code snippet with a label score of one, in response to the user-determined code snippet feedback being a match for the first recommended code snippet;
   label all code snippet training pairs that include any of the recommended code snippets in the list of recommended code snippets with a closer similarity score than the first recommended code snippet with a label score of less than one; and
   not label any code snippet training pairs that include any of the recommended code snippets in the list of recommended code snippets in response to the user-determined code snippet feedback being a no answer for the first recommended code snippet.

6. The apparatus of claim 4, wherein the processor circuitry is to:
   train a downstream task model to calculate the similarity score by feeding the downstream task model a training dataset of the code snippet training pair in the training database.

7. The apparatus of claim 1, wherein the processor circuitry is to:
   label the code snippet training pair with a score of one in response to the user-determined code snippet feedback being a match and label the code snippet training pair with a score of zero in response to the user-determined code snippet feedback being a no match.

8. The apparatus of claim 1, wherein the processor circuitry is to:
   cause storage of the code snippet training pair with the detected malicious user-determined code snippet feedback in a malicious code snippet pair database;
   cause storage of identification information about the user; and
   cause storage of a count of malicious user-determined code snippet feedback attempts by the user.

9. The apparatus of claim 8, wherein the processor circuitry is to:
   ignore user-determined code snippet feedback from the user in response to the count of malicious user-determined code snippet feedback attempts exceeding a threshold.

10. At least one non-transitory computer-readable storage medium comprising instructions that, when executed, cause one or more processors of a machine to at least:
    collect a user code snippet;
    determine a structured representation of the user code snippet;
    generate a recommended code snippet using the structured representation of the user code snippet;
    obtain user-determined code snippet feedback from a user comparing the user code snippet to the recommended code snippet, the user-determined code snippet feedback indicating one of a match, no match, or uncertain;
    detect malicious user-determined code snippet feedback from the user;
    in response to detecting the malicious user-determined code snippet feedback from the user, disallow storage of a code snippet training pair in a training database, the code snippet training pair to include the user code snippet and the recommended code snippet; and
    cause storage of the code snippet training pair in the training database.

11. The at least one non-transitory computer-readable storage medium of claim 10, wherein the instructions, when executed, cause the one or more of the processors of the machine to:
    present the recommended code snippet to a user in an integrated development environment.

12. The at least one non-transitory computer-readable storage medium of claim 10, wherein the instructions, when executed, cause the one or more of the processors of the machine to:

create a real-valued code vector from the structured representation of the user code snippet by processing the structured representation of the user code snippet through a neural network; and retrieve the recommended code snippet from a recommendation database using the real-valued code vector.

13. The at least one non-transitory computer-readable storage medium of claim 12, wherein the instructions, when executed, cause the one or more of the processors of the machine to:

calculate a similarity score of the real-valued code vector to a closest recommended code snippet database cluster using a distance metric, the closest recommended code snippet database cluster including the recommended code snippet;

populate a list of recommended code snippets at least partially with the recommended code snippet; and sort the list of recommended code snippets with a most confident recommended code snippet with a closest similarity score first to a least confident recommended code snippet with a furthest similarity score last.

14. The at least one non-transitory computer-readable storage medium of claim 13, wherein the instructions, when executed, cause the one or more of the processors of the machine to:

for a first user-selected recommended code snippet in the list of recommended code snippets, label the code snippet training pair including the first recommended code snippet with a label score of one, in response to the user-determined code snippet feedback being a match for the first recommended code snippet;

label all code snippet training pairs that include any of the recommended code snippets in the list of recommended code snippets with a closer similarity score than the first recommended code snippet with a label score of less than one; and not label any code snippet training pairs that include any of the recommended code snippets in the list of recommended code snippets in response to the user-determined code snippet feedback being a no answer for the first recommended code snippet.

15. The at least one non-transitory computer-readable storage medium of claim 13, wherein the instructions, when executed, cause the one or more of the processors of the machine to:

train a downstream task model to calculate the similarity score by feeding the downstream task model a training dataset of the code snippet training pair in the training database.

16. The at least one non-transitory computer-readable storage medium of claim 10, wherein the instructions, when executed, cause the one or more of the processors of the machine to:

label the code snippet training pair with a score of one in response to the user-determined code snippet feedback being a match and labeling the code snippet training pair with a score of zero in response to the user-determined code snippet feedback being a no match.

17. The at least one non-transitory computer-readable storage medium of claim 10, wherein the instructions, when executed, cause the one or more of the processors of the machine to:

cause the storage of the code snippet training pair with the detected malicious user-determined code snippet feedback in a malicious code snippet pair database;

cause the storage of identification information about the user; and cause the storage of a count of malicious user-determined code snippet feedback attempts by the user.

18. The at least one non-transitory computer-readable storage medium of claim 17, wherein the instructions, when executed, cause the one or more of the processors of the machine to:

ignore user-determined code snippet feedback from the user in response to the count of malicious user-determined code snippet feedback attempts exceeding a threshold.

19. An apparatus comprising:

processor circuitry including one or more of:

at least one of a central processor unit, a graphic processor unit or a digital signal processor, the at least one of the central processor unit, the graphic processor unit or the digital signal processor having control circuitry to control data movement within the processor circuitry, arithmetic and logic circuitry to perform one or more first operations corresponding to instructions, and one or more registers to store a result of the one or more first operations, the instructions in the apparatus;

a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or an Application Specific Integrate Circuitry (ASIC) including logic gate circuitry to perform one or more third operations;

the processor circuitry to perform at least one of the one or more first operations, the one or more second operations or the one or more third operations to instantiate:

an integrated development environment circuitry to collect a user code snippet;

a structured representation determiner circuitry to determine a structured representation of the user code snippet;

a recommended code snippet generator circuitry to generate a recommended code snippet using the structured representation of the user code snippet;

a feedback obtainer circuitry to: obtain user-determined code snippet feedback from a user comparing the user code snippet to the recommended code snippet, the user-determined code snippet feedback indicating one of a match, no match, or uncertain;

detect malicious user-determined code snippet feedback from the user; and in response to detecting the malicious user-determined code snippet feedback from the user, disallow storage of a code snippet training pair in a training database, the code snippet training pair to include the user code snippet and the recommended code snippet; and a training dataset storing circuitry to store the code snippet training pair in the training database.

20. The apparatus of claim 19, wherein the processor circuitry is to perform at least one of the one or more first operations, the one or more second operations or the one or more third operations to instantiate:

the integrated development environment to present the recommended code snippet to a user.

21. The apparatus of claim 19, wherein the processor circuitry is to perform at least one of the one or more first operations, the one or more second operations or the one or more third operations to instantiate:

a code vector creator circuitry to create a real-valued code vector from the structured representation of the user code snippet by processing the structured representation of the user code snippet through a neural network; and a recommended code snippet retriever circuitry to retrieve the recommended code snippet from a recommendation database using the real-valued code vector.

22. The apparatus of claim 21, wherein the processor circuitry is to perform at least one of the one or more first operations, the one or more second operations or the one or more third operations to instantiate:

a similarity score calculator circuitry to calculate a similarity score of the real-valued code vector to a closest recommended code snippet database cluster using a distance metric, the closest recommended code snippet database cluster including the recommended code snippet;

a list populator circuitry to populate a list of recommended code snippets at least partially with the recommended code snippet; and a list sorter circuitry to sort the list of recommended code snippets with a most confident recommended code snippet with a closest similarity score first to a least confident recommended code snippet with a furthest similarity score last.

23. The apparatus of claim 22, wherein the processor circuitry is to perform at least one of the one or more first operations, the one or more second operations or the one or more third operations to instantiate:

a training dataset sending circuitry to train a downstream task model to calculate the similarity score by feeding the downstream task model a training dataset of the code snippet training pair in the training database.

* * * * *